United States Patent
Ran et al.

(10) Patent No.: US 11,995,430 B2
(45) Date of Patent: May 28, 2024

(54) SYSTEMS AND METHODS FOR MANAGEMENT OF UNMANNED AERIAL VEHICLES

(71) Applicant: International Business Machines Corporation, Armonk, NY (US)

(72) Inventors: Chuan Ran, Morrisville, NC (US); Oluwanifemi Oluyemi, Toronto (CA); Vamsee Movva, Cary, NC (US); A. Jaylani Sharif, Ashburn, VA (US)

(73) Assignee: International Business Machines Corporation, Armonk, NY (US)

(*) Notice: Subject to any disclaimer, the term of this patent is extended or adjusted under 35 U.S.C. 154(b) by 17 days.

(21) Appl. No.: 17/481,818

(22) Filed: Sep. 22, 2021

(65) Prior Publication Data
US 2023/0090324 A1  Mar. 23, 2023

(51) Int. Cl.
*G06F 8/65*  (2018.01)
*G06F 8/61*  (2018.01)
*G06F 8/71*  (2018.01)

(52) U.S. Cl.
CPC .................. *G06F 8/65* (2013.01); *G06F 8/61* (2013.01); *G06F 8/71* (2013.01)

(58) Field of Classification Search
CPC .................. G06F 8/65; G06F 8/61; G06F 8/71
See application file for complete search history.

(56) References Cited

U.S. PATENT DOCUMENTS

| | | | | |
|---|---|---|---|---|
| 6,154,693 A * | 11/2000 | Aberschitz | ............ | G01S 5/0054 701/16 |
| 9,412,278 B1 * | 8/2016 | Gong | ................... | G08G 5/0008 |
| 9,613,534 B2 | 4/2017 | Elmasry et al. | | |
| 9,738,383 B2 | 8/2017 | Adams | | |
| 10,162,351 B2 | 12/2018 | Shaw | | |
| 10,399,706 B1 * | 9/2019 | Hanlon | ..................... | G06F 8/65 |
| 10,735,908 B2 * | 8/2020 | Liang | ........................ | G01S 5/01 |

(Continued)

OTHER PUBLICATIONS

Anonymous, "Method and System for an Improved and Efficient Cloud-Based Drone Marketplace," IP.com No. IPCOM000249285D, IP.com Electronic Publication Date: Feb. 15, 2017, 4 pages.

(Continued)

*Primary Examiner* — Jae U Jeon
(74) *Attorney, Agent, or Firm* — Scully, Scott, Murphy & Presser, P.C.

(57) ABSTRACT

A system, platform, computer program product, and/or method for managing UAV resources is disclosed that includes: receiving UAV specifications to provision one or more UAVs; converting the UAV specifications to UAV specification metadata; transforming the UAV specification metadata to UAV configuration metadata to configure UAV software for the one or more UAVs; and configuring, using the UAV configuration metadata, the UAV software for the one or more UAVs. The system, platform, program product, and method can further include assembling, using the UAV configuration metadata, the UAV hardware of the one or more UAVs; deploying the one or more UAVs from a base location to a new location; transferring control over operation of the one or more UAVs to a third-party operator; creating and configuring a network connection to the one or more UAVs; and/or remotely logging into an operating system of the one or more UAVs.

20 Claims, 10 Drawing Sheets

(56) References Cited

U.S. PATENT DOCUMENTS

| | | | |
|---|---|---|---|
| 11,355,021 B1* | 6/2022 | Miao | G08G 5/0069 |
| 2004/0123091 A1* | 6/2004 | Das | H04L 9/40 |
| | | | 713/2 |
| 2012/0245834 A1* | 9/2012 | Klooster | G08G 5/0034 |
| | | | 701/120 |
| 2015/0051783 A1* | 2/2015 | Tamir | G05D 1/0088 |
| | | | 701/25 |
| 2016/0307449 A1* | 10/2016 | Gordon | G08G 5/0043 |
| 2016/0357183 A1 | 12/2016 | Shaw | |
| 2017/0236428 A1 | 8/2017 | High et al. | |
| 2017/0323319 A1* | 11/2017 | Rattner | G06N 20/00 |
| 2018/0128895 A1* | 5/2018 | Seeber | G08G 5/0026 |
| 2018/0155023 A1* | 6/2018 | Choi | G05D 1/0038 |
| 2018/0186473 A1 | 7/2018 | Erickson et al. | |
| 2018/0342168 A1 | 11/2018 | Gordon et al. | |
| 2019/0042227 A1* | 2/2019 | Sharma | G06V 20/176 |
| 2019/0205830 A1* | 7/2019 | O'Brien | G06Q 10/0832 |
| 2019/0391575 A1* | 12/2019 | Hortner | G08G 5/0039 |
| 2020/0020236 A1* | 1/2020 | Zhou | G08G 5/006 |
| 2020/0364189 A1* | 11/2020 | Lee | G06F 21/64 |
| 2021/0304130 A1* | 9/2021 | Isberg | G06Q 10/0832 |
| 2022/0374027 A1* | 11/2022 | Watts | G05D 1/101 |

OTHER PUBLICATIONS

Anonymous, "A Method of Shared UAV Delivery Management," An IP.com Prior Art Database Technical Disclosure, IP.com No. IPCOM000260269D, IP.com Electronic Publication Date: Nov. 8, 2019, 5 pages.

Anonymous, "A Method and System for Managing a Fleet of Drones," IP.com No. IPCOM000243855D, IP.com Electronic Publication Date: Oct. 22, 2015.

Choi S., et al., "Enabling drone as a service: OneM2M-based UAV/drone management system," 2017 Ninth International Conference on Ubiquitous and Future Networks (ICUFN), 2017, pp. 18-20.

Alwateer, M. et al., "Emerging Drone Services: Challenges and Societal Issues," in IEEE Technology and Society Magazine, vol. 39, No. 3, pp. 47-51, Sep. 2020.

* cited by examiner

SYSTEMS AND METHODS FOR MANAGEMENT OF UNMANNED AERIAL VEHICLES

TECHNICAL FIELD

The present invention relates to commissioning, provisioning, configuring, deploying, operating, managing, monitoring, and/or decommissioning Unmanned Aerial Vehicles (UAVs), for example a fleet of UAVs, for use by third parties to deliver goods and/or provide services, including cloud-based UAV management as a service.

BACKGROUND

Unmanned aerial vehicles (UAVs) are under development for the delivery of goods, for example where a vendor can ship out merchandise to a buyer's location using a UAV. Vendors like Amazon, Walmart, and others have run tests for shipping goods to customers using UAVs. However, vendors without the resources of larger vendors cannot easily deploy UAVs to provide their goods or services to customers. It would be advantageous to have an easy way to commission, provision, configure, assemble, deploy, operate, manage, monitor and/or decommission UAVs for various services, and for example, for third parties to commission UAVs for a multitude of purposes from third parties who would configure, deploy and manage the UAV resources. It would be beneficial for individuals and enterprises without technical knowledge of UAV technologies to be able to commission UAVs that are supplied programmed and configured to meet a user's customized needs without the user operator having to configure and manage the hardware, software, and other parameters regarding their use. It would be further advantageous to relieve a user of UAVs from the provisioning, configuring, assembling, deploying, and managing of UAVs so they can focus on the use and/or operational tasks to be performed by the UAVs.

SUMMARY

The summary of the disclosure is given to aid understanding of the commissioning, provisioning, configuring, assembling, deploying, operating, managing, monitoring, and/or decommissioning of unmanned aerial vehicles (UAVs), and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the platform, the architectural structure, and/or methods described to achieve different effects. In this regard it will be appreciated that the disclosure presents and describes one or more inventions, and in aspects includes numerous inventions as defined by the claims.

A system, platform, tool, computer program product, and/or method is disclosed for commissioning, provisioning, configuring, assembling, deploying, operating, managing, monitoring, maintaining, and/or decommissioning one or more UAVs for use by third parties. A computer-implemented system, platform, tool, computer program product and/or method for managing unmanned aerial vehicle (UAV) resources according to one or more embodiments includes: receiving UAV specifications to provision one or more UAVs; converting the UAV specifications to UAV specification metadata; transforming the UAV specification metadata to UAV configuration metadata to assemble UAV hardware and to configure UAV software for the one or more UAVs; and configuring, using the UAV configuration metadata, the UAV software for the one or more UAVs. According to one or more aspects, a computer-implemented system, platform, tool, computer program product and/or method for managing unmanned aerial vehicle (UAV) resources further includes: assembling, using the UAV configuration metadata, the UAV hardware of the one or more UAVs; deploying the one or more UAVs from a base location to a new location pricing use of the one or more UAVs and/or pricing use of the UAV resources. The computer-implemented system, platform, tool, computer program product and/or method for managing unmanned aerial vehicle (UAV) resources further includes in one or more approaches: transferring control over operation of the one or more UAVs to a third-party operator; creating and configuring a network connection to the one or more UAVs; remotely logging into an operating system of the one or more UAVs; and/or loading each of the one or more UAVs with a UAV provider API package comprising a group of minified operating system containers running in parallel, wherein the UAV provider API package detects UAV events.

In one or more embodiments, the computer-implemented system, platform, tool, computer program product and/or method for managing unmanned aerial vehicle (UAV) resources further includes: decommissioning the one or more UAVs, wherein decommissioning the one or more UAVs comprises at least one of a group consisting of: transferring control over operation of the one or more UAVs to a different operator, decommissioning a network connection to the one or more UAVs, and combinations thereof. Managing the UAV resources in one or more aspects includes at least one of a group consisting of: allocating one or more UAVs; deploying one or more UAVs; handling navigation functions of one or more UAVs; selecting, assembling, and updating one or more UAV hardware configurations; selecting, installing, and updating UAV software; setting up and managing UAV network connections and settings; handling battery charging functions of the one or more UAVs; and combinations thereof. In one or more embodiments, the computer-implemented system, platform, tool, computer program product and/or method includes monitoring the one or more UAVs, wherein monitoring the one or more UAVs comprises monitoring at least one of a group consisting of: a battery condition; navigation functions of the one or more UAVs; activities of the one or more UAVs; location of the one or more UAVs; configurations of the one or more UAVs; network settings of the one or more UAVs; status of the UAV resources; and combinations thereof. The UAV specifications selected by a user can in an embodiment include at least one of a group consisting of: UAV model; battery type; battery size; number of motors; payload capacity; operating speed of the UAV; maximum speed of the UAV; network interface; network settings; network configuration; camera operation; temperature range; GPS specification; and combinations thereof.

The computer-implemented system, platform, tool, computer program product and/or method further includes according to one or more approaches one or more access methods to commission the one or more UAVs comprising at least one of a group consisting of: command line interface (CLI); infrastructure as code (IaC); Representational State Transfer Application Program Interface (REST API); and combinations thereof. According to one or more aspects, the computer-implemented system, platform, tool, computer program product and/or method includes managing a battery condition of a UAV wherein managing a battery condition of a UAV includes: detecting a low battery condition; providing a notification in response to the low battery condition; and implementing a change in UAV operation in response to detecting a low battery condition. In a further aspect, the computer-implemented system, platform, tool, computer program product and/or method includes: determining whether a UAV user implements a change in UAV operation; and taking control, in response to the UAV user not implementing a change in UAV operation, of the UAV by at least one of a group comprising: a UAV provider; UAV provider computing resources; Central Computing Resource Environments; and combinations thereof.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. The claims should not be limited to the precise arrangement, structures, systems, platforms, architectures, modules, functional units, assemblies, subassemblies, circuitry, configurations, embodiments, programming, features, aspects, methods, processes, techniques, devices and/or details shown, and the arrangements, structures, systems, platforms, architectures, modules, functional units, assemblies, subassemblies, circuitry, configurations, embodiments, programming, features, aspects, methods, processes, techniques, devices and/or details shown may be used singularly or in combination with other arrangements, structures, systems, platforms, architectures, modules, functional units, assemblies, subassemblies, circuitry, configurations, embodiments, programming, features, aspects, methods, techniques, processes, devices and/or details. The accompanying drawings include the following figures where:

DETAILED DESCRIPTION

Figure 1:
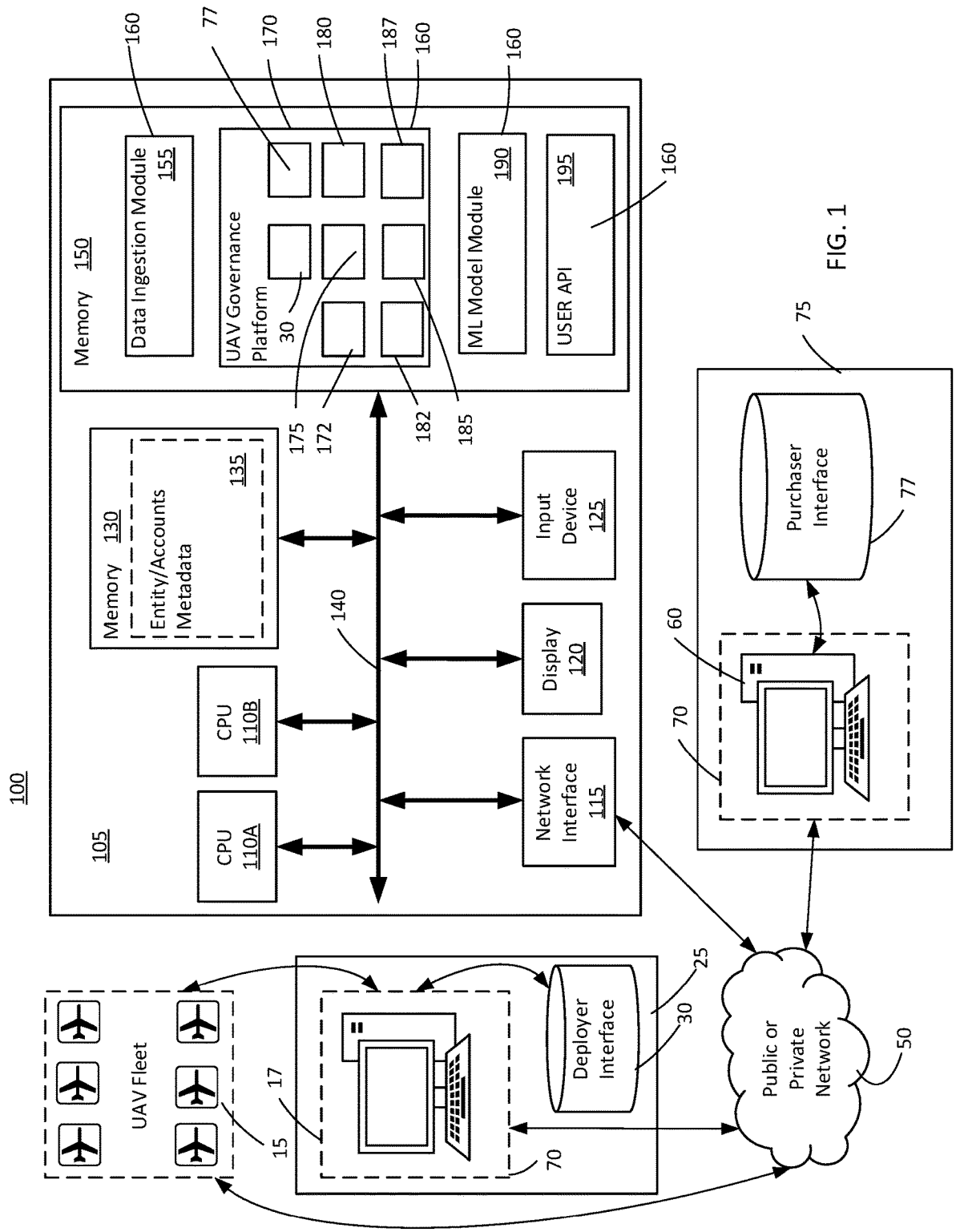
FIG. 1 depicts a schematic diagram of one illustrative implementation of a system 100 to commission, provision, configure, deploy, operate, manage, monitor, and/or decommission one or more unmanned aerial vehicles (UAVs) for use by a third party according to an embodiment of the disclosure.

The following description is made for illustrating the general principles of the invention and is not meant to limit the inventive concepts claimed herein. In the following detailed description, numerous details are set forth in order to provide an understanding of the system, platform, tool, computer program product, method, and/or techniques for commissioning, pricing, provisioning, configuring, assembling, deploying, providing, operating, managing, monitoring, and/or decommissioning one or more unmanned aerial vehicles (UAVs) for use by, for example, third parties, however, it will be understood by those skilled in the art that different and numerous embodiments of the system, platform, and/or its method of operation may be practiced without those specific details, and the claims and disclosure should not be limited to the features, aspects, arrangements, structures, systems, assemblies, subassemblies, platforms, architectures, configurations, modules, functional units, circuitry, embodiments, programming, processes, methods, techniques, and/or details specifically described and shown herein. Further, particular features, aspects, arrangements, structures, systems, assemblies, subassemblies, platforms, architectures, modules, functional units, circuitry, embodiments, programming, methods, processes, techniques, details, etc. described herein can be used in combination with other described features, aspects, arrangements, structures, systems, assemblies, subassemblies, platforms, architectures, modules, functional units, circuitry, embodiments, programming, techniques, methods, processes, details, etc. in each of the various possible combinations and permutations.

The following discussion omits or only briefly describes conventional features of information processing systems and data networks, including computer-implemented cognitive systems, data analytics programs, deep learning, and/or machine learning systems/programming, which should be apparent to those skilled in the art. It is assumed that those skilled in the art are familiar with data analytics and machine learning (ML) systems, including large scale cognitive analytics and their operation, the processing of data for use in such large-scale cognitive analytics, the application of cognitive analytics, including, for example, analytics systems and processes to detect patterns. It may be noted that a numbered element is numbered according to the figure in which the element is introduced, is typically referred to by that number throughout succeeding figures, and like reference numbers generally represent like parts of the illustrative embodiments of the invention.

The disclosure in one or more embodiments describes a system, platform, tool, computer program product and/or method to commission and provision unmanned aerial vehicles (UAVs) and configure their operating systems, networks, hardware specifications, software specifications, and/or navigation systems. In one or more aspects, a system, platform, tool, computer program product and/or method is disclosed that utilizes cloud graphics user interface (GUI), terminal command line interface (CLI), infrastructure as code (IAC), and/or digital diagrams (and/or hand drawn sketches) to provision the one or more interfaces. After the purchaser/renter orders the one or more UAVs, and the UAV provider provisions, configures, assembles, and deploys the one or more UAVs, the one or more UAVs fly from the provider/deployer's base and/or hub to the specified location of the purchaser/user configured as specified by the purchaser/user. The purchaser in the typical scenario is a renter or leasee of the UAV resources that will use and operate the UAV resources for a period of time and return the UAV at the end of the time period (or upon completion of one or more tasks).

The UAV-as-a-service systems, platforms, programming, and/or methods to provision, price, configure, assemble, deploy, operate, manage, monitor, maintain, and/or decommission the UAV-as-a-service in one or more embodiments provides configuring and/or assembling the one or more UAVs including configuring the hardware specifications, the network set-up, and/or the software specifications (from or with the assistance of a cloud computing environment); renting out the one or more UAVs under different pricing scenarios; and deploying the one or more UAVs from a cloud environment. The one or more UAVs in an approach are deployed using a GUI, terminal CLI, Infrastructure-as-Code (IAC), and/or digital diagrams (and/or hand drawn sketches). The pricing for renting the one or more UAVs in one or more embodiments can be based upon the specifications of the UAV and by the rental time period. For example, pricing can be based upon the amount of time, the period of the day, and demand. For example, demand might be highest in late mornings (e.g., 10 am-noon), midday (e.g., noon-4 pm), and early evenings (6 pm-8 pm), and demand might be lightest during overnight hours (e.g., 1 am-6 am). The UAV infrastructure can be rented by the second, hourly, daily, weekly, monthly, etc., or by customized contract. Configuring and managing the UAVs comprise configuring and managing several specifications including, for example, hardware requirements, software requirements, networking, remote login to UAV operating system, activity logging, monitoring, pricing, decommissioning, software updates, etc.

A purchaser and/or operator according to one or more embodiments creates UAV specifications via various input methods and sends a request to the UAV provider (e.g., the UAV deployer) for the UAV resources to be deployed. The operator preferably can provision, operate, and decommission the UAV resource without any physical interaction with the UAV. A UAV provider in an approach configures and deploys the one or more requested UAVs to the purchaser/operator. A cloud service provider or other third party in an approach assists with and/or configures the UAV resources (the one or more UAVs) for the deployer. The UAV deployer and/or cloud service provider can perform the configuring, management, and monitoring tasks on the UAV such as, for example, what hardware should be used, what software should be installed, the network configuration, where it should fly, navigation functions, and/or charging, among other functions. The system, platform, tool, programming, and/or method provides the ability to specify multiple UAV specifications, and UAV operations begin after the deployer executes functions to configure and deploy the UAV. Once the UAV is ready, in an embodiment the UAV user/renter takes control of the UAV resources and billing operations commence. In one or more aspects, the UAV provider has one or more base (e.g., hub) locations and can also have remote or satellite locations, and the UAV provider's various locations can provide and coordinate the provisioning, configuring, assembling, networking, power charging, managing, and/or decommissioning of UAV resources.

Components of the system, platform, and/or tool include a User Interface, an Application Program Interface (API) Layer, a Metadata Converter, a Base Application Program Interface (API), and a Network Communication Module. The User Interface provides programming, instructions, and/or logic for operating circuitry to perform one or more of the functions of requesting and decommissioning the one or more UAVs including providing remote log-in, network setup, and providing UAV details. The User Interface can be built with any frameworks available via browser, desktop, mobile and/or terminal console. The API Layer employs programming, instructions, and/or logic to operate circuitry to expose the UAV Provider functionalities to various access methods such as Command Line Interface (CLI), Infrastructure as Code (IaC), Representational State Transfer (REST) API, etc. The Metadata Converter or Converter API provides programming, instructions, and/or logic for operating circuitry to convert the metadata representing UAV resources provided by the purchaser to readable configuration used by the UAV provider (including, for example, the cloud services).

The Base API provides programming, instructions, and/or logic for operating circuitry to transform UAV resource specification metadata into actual UAV resources. The Network Communication Module provides inter and intra vehicular communications including handling the settings for software defined networks for the UAV(s). The network can be setup for a single UAV and interconnection between other UAVs and several other cloud resources, including but not limited to virtual servers, cloud functions, and/or storage. Other modules are contemplated, such as, for example, pricing modules that combine data to build a correlating cost for the UAV resources to be deployed. These APIs and modules in one or more approaches include machine learning (ML) models and data analytic modules to properly schedule, allocate, provide navigation functions, manage, monitor, maintain, and/or price UAV resources.

In one or more embodiments, the system, platform, tool, programming instructions, and/or methods are used to provision one or more UAVs, set-up networking for a single UAV or multiple UAVs; set-up interconnections between the one or more UAVs and control (operation, management, monitoring, and/or maintenance) resources, and/or decommission one or more UAVs. For example, control recourses can include monitoring operations which monitor and log UAV activity so that, for example, UAV providers can receive real-time updates on the status and state of their UAV inventory; maintenance operations which upgrade UAV software and install software packages; and remote UAV operation which permits an UAV operator and/or UAV provider to login to the Operating System (O/S) of the one or more UAVs and remotely manage and/or control the one or more UAVs.

UAV Management System 100 according to an embodiment as shown in FIG. 1 includes Central Resource Computing Environment 105, private or public network 50, UAV Provider Computing Resources 25 (also referred to as UAV Deployer Computing Resources 25), Customer/Operator Computing Resources 75, and UAV resources 15. One or more private or public networks 50 permits Central Resource Computing Environment 105 to communicate with UAV Provider Computing Resources 25, Operator Computing Resources 75, and/or UAV resources 15; as well as UAV Provider Computing Resources 25 to communicate with Central Resource Computing Environment 105, Operator Computing Resources 75, and/or UAV resources 15. Private or public networks also permit Operator Computing Resources 75 to communicate with Central Resource Computing Environment 105, UAV Provider Computing Resources 25, and/or UAV resources 15. While FIG. 1 only shows one private or public network 50 it can be appreciated that one or more private or public networks can provide communication between Central Resource Computing Environment 105, UAV Provider Computing resources 25, Operator Computing Resources 75, and/or UAV resources 15. In other words, in one or more embodiments each of Central Resource Computing Environment 105, UAV Provider Computing resources 25, Operator Computing Resources 75, and UAV resources 15 can communicate with each other.

Central Resource Computing Environment 105 includes one or more hardware processors 110A, 110B (also referred to as central processing units (CPUs)), a memory 130 local to the processors, main memory 150 (e.g., for storing an operating system, application program interfaces (APIs) and programs), a network interface 115, a display device 120, an input device 125, and interconnect and/or communication channel 140, and any other features common to a computing device. In one or more aspects, Central Resource Computing Environment 105, also referred to as a Platform 105, can, for example, be or include any computing device that is configured to communicate via a private or public communications network 50 with one or more networks and/or websites including with one or more cloud-based or web-based servers 70.

In the embodiment depicted in FIG. 1, processors 110A, 110B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 110A, 110B are configured to execute instructions as described below. These instructions may be stored, for example, as programs and/or programmed modules in local memory 130, main memory 150, or an associated memory storage device (not shown).

With respect to configuring Central Resources Computing Environment 105 for provisioning, configuring, assembling, deploying, operating, managing, monitoring and/or decommissioning UAV resources 15, the local memory 130 may be configured for storing programs, modules, data, information, records, and associated meta-data 135, or portions thereof as needed. Memory 130 may include, for example, non-transitory computer readable media in the form of volatile memory, such as random-access memory (RAM) and/or cache memory or others. Memory 130 can receive programs, modules, data, information, records, and associated data from, for example memory 150, or over network interface 115. Memory 130 may include, for example, other removable/non-removable, volatile/non-volatile storage media.

Network interface 115 is configured to transmit and receive data or information to and from a network 50 via one or more web-site servers 70 (e.g., Operator Computing Resources 75, UAV Provider Computing Resources 25, and/or UAV resources 15) via wired or wireless connections. For example, network interface 115 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows Central Resource Computing Environment 105 to transmit information to or receive information from servers 70 (e.g., Operator Computing Resources 75, UAV Provider Computing Resources 25, and/or UAV resources 15).

Web-based server 70 can be for or attached to one or more Customer/Operator Computing Resources 75 for UAV customers and/or operators who wish to purchase or use UAV resources. Operator Computing Resources 75 in an aspect includes a purchaser/customer interface 77. Operator Computing Resources 75 in one or more embodiments is adapted and configured to communicate with Central Resource Computing Environment 105, UAV Provider Computing Resources 25, and/or the UAV resources 15. Central Resource Computing Environment 105 can also be configured to communicate via private or public communications network 50 with UAV Provider Computing Resources 25 and/or UAV resources 15. UAV Provider Computing Resources 25 are adapted and configured for UAV providers to provision, configure, assemble, deploy, manage, control, monitor and/or decommission UAV resources 15, e.g., UAVs 15). The UAV Provider Computing Resources 25 include a Deployer Interface 30 (e.g., a Deployer/Provider console 30). UAV Provider Computing Resources 25 can also be configured to communicate via private or public communications network 50 with the UAV fleet 15 (e.g., individually or collectively with the UAVs 15). It can be appreciated that the system 100 can be set up for direct peer-to-peer communications between one or more of Central Resource Computing Environment 105, UAV Provider Computing Resources 25, Operator Computing Resources 75, and/or the UAV resources 15, and that communications with the UAV resources 15 will be wireless during flight operations, although wired connections can also be utilized, for example while the UAV is docked.

Display 120 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 120 may include a liquid crystal display (LCD), an e-paper/e-ink display, an organic LED (OLED) display, or other similar display technologies. In an aspect, display 120 may be touch-sensitive and may also function as an input device. Input device 125 may include, for example, a keyboard, a mouse, a touch-sensitive display, a keypad, a microphone, or other similar input devices or any other input devices that may be used alone or together to provide a user with the capability to interact with the central resource computing environment 105.

In the context of commissioning, provisioning, configuring, assembling, operating, managing, monitoring and/or decommissioning UAV resources, for example, for lease or renting to one or more customers, according to an embodiment, Central Resource Computing Environment 105, UAV Provider Computing Resources 25, and/or UAV Operator Computing Resources 75, UAV resources 15 can be and/or include a computing device configured to run UAV commissioning, pricing, provisioning, configuring, assembling, networking, deploying, operating, managing, monitoring, maintaining, and/or decommissioning software applications and models. In one or more aspects, Central Resource Computing Environment 105, UAV Provider Computing Resources 25, UAV Operator Computing Resources 75, and/or UAV resources 15 can include or be, for example, server computer systems, mainframe computers, distributed cloud computer systems, personal computer (PC) systems, PC networks, thin clients, thick clients, minicomputer systems, laptop devices, hand-held devices, smart devices, smart phones, set top boxes, programmable consumer electronics, multiprocessor systems, microprocessor-based systems, and/or other similar computing or processor based devices, an embodiment of which is described in more detail in FIGS. 12-14. It will be appreciated that in one or more embodiments UAV Management system 100 and/or the Central Resource Computing Environment 105 preferably includes or is a distributed cloud computing environment or system as described in connection with FIGS. 12-13, while UAV provider Computing Resources 25, including the UAV provider interface/console 30; Operator Computing Resources 75 including operator interface/console 77, and UAV resources preferably includes or is a computing device as described in more detail in FIG. 14.

Memory 150 of Central Resource Computing Environment 105 in one or more embodiments stores processing modules that include programmed instructions adapted to run analytical models, functional units, and/or other modules 160 to load, process, analyze, assess, transform, store, and output data. Memory 150 of central resource computing environment 105 in one or more embodiments stores tools, and/or platforms that include or constitute one or more functional units (e.g., modules) 160 having programming, instructions, and/or logic for operating circuitry to provision, configure, assemble, operate, manage, monitor, price, and/or decommission UAV resources 15, e.g., one or more UAVs. By way of non-limiting examples only, memory 150 may include a non-transitory medium for storing data, information, and/or instructions, including a portable computer diskette, a hard disk, Solid-State Drive (SSD), a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In an embodiment, one of the programmed processing modules stored at memory 150 includes a Data Ingestion Module 155 that provides instructions and logic for operating circuitry to access/read/load/process large amounts of data (e.g., UAV specifications, navigational information, monitoring and activity logging data, etc.) preferably for use by other modules (e.g., the analytical and/or machine learning (ML) models) that can further process and analyze the data. In one or more embodiments, the input data for Bulk Load Module 155 comprises UAV specifications, UAV monitoring and activity logging data, pricing data, parties, accounts, etc., and updated data and information on the same.

In an embodiment, memory 160 includes a UAV Governance Platform 170 that provides instructions and logic for operating circuitry to process and analyze data to provision, configure, assemble, deploy, govern, operate, manage, monitor, maintain, and/or decommission one or more UAVs 15. UAV Governance Platform 170 (also referred to as Governance Platform 170, Platform 170, Framework 170, Tool 170, or Module 170) preferably contains one or more modules to interface with UAV Provider Computing Resources 25, UAV Operator Computing Resources 75, and/or UAV resources 15. UAV Governance Platform 170 in one or more embodiments includes a Customer (or purchaser) Interface 77, a UAV Provider Interface 30, an API Layer 172, a Metadata Converter Module 175, a Base Module 180, a Pricing Module 182, a UAV Network Communication Module 185, and/or a Management and Monitoring Module 187.

Customer Interface 77 contains programming, instructions and/or logic for operating circuitry to permit a third party, e.g., a customer or operator, to commission, provision, remote login, perform network set-up, operate, and/or decommission one or more UAVs. UAV Provider Interface 30 employs programming, instructions, and/or logic for operating circuitry to permit a UAV provider to provision, configure, assemble, deploy, manage, monitor, and/or decommission one or more UAV resources. API Layer 172 contains programming, instructions, and/or logic for operating circuitry to expose UAV service functionalities to various access methods such as Command-Line-Interface (CLI), Infrastructure as Code (IaC), a Representational State Transfer Application Program Interface (Rest API), etc.

Metadata Converter Module 175 includes programming, instructions, and/or logic for operating circuitry to convert the UAV specifications entered by a customer/operator into UAV resource specification (e.g., configuration) metadata. Base Module 180 contains programming, instructions and/or logic for operating circuitry to transform the UAV resource specification metadata into UAV resources, including for example instructions for configuring the hardware and software for the UAV(s). Pricing Module 182 employs programming, instructions, and/or logic for operating circuitry to combine all the data and metadata to calculate and/or build up a correlating cost for the UAV resource to be deployed.

UAV Network Communication Module 185 includes programming, instructions, and/or logic for operating circuitry to set-up and operate inter and intra UAV network communications including handling the settings for software defined networks for one or more of the UAVs, and/or remote login to the one or more UAVs. UAV Network Communication Module 185 can set up networking for a single UAV and interconnection between other UAVs, as well as networking and interconnection to other resources, such as, for example, Central Resource Computing Environment 105, UAV Provider Computing Resources 25, and/or UAV Operator Computing Resources 75.

Management and Monitoring Module 187 provides programming, instructions, and/or logic for operating circuitry to manage, control, and/or monitor the operation of the one or more UAVs. Managing the UAVs through the Management and Monitoring Module 187 can in an aspect include maintaining the UAVs including, for example, upgrading software of the UAV, installing software packages, providing alerts or notifications of UAV hardware issues, e.g., issues with the battery, motors, navigation systems and servos, docking structures, etc. Maintenance and Monitoring Module 187 can also handle and/or provide remote management features such as, for example, how an operator can remotely manage and control the UAV as well as login to the operating system of the UAV. Management and Monitoring Module 187 also provides monitoring and activity logging services where, for example, customers/operators and/or UAV providers/deployers can receive real-time updates on the status, state and/or location of the UAV(s). Location and/or navigation services are a further feature that in an approach is provided by Management and Monitoring Module 187.

UAV Governance Platform 170 utilizes technologies such as, for example, user interface frameworks to create user interface consoles on for example UAV Provider Computing Resources 25, and/or UAV Operator Computing Resources 75. The User Interface (e.g., customer/operator interface and/or UAV provider/deployer interface) can be built with frameworks available via Brower, Desktop, Mobile or Terminal console. Governance Platform 170 can further include and/or utilize, for example, infrastructure as code (IaC) tools or framework such as, but not limited to, Terraform, Yaml Script, and/or JSON scripts. Governance Platform 170 can in an embodiment further include Command Line Interface (CLI) tools to perform UAV operations.

Governance Platform 170 in one or more approaches can contain and call up one or more modules, models and/or functional units 160 to process and analyze the data to commission, provision, price, configure, assemble, operate, manage, control, monitor, maintain, and/or decommission UAV resources 15. Governance Platform/Module 170 can include and invoke, for example, supervised (or unsupervised) machine learning (ML) techniques through, for example, ML Model Module 190, for commissioning, configuring, pricing, assembling, deploying, operating, managing, controlling, navigating, monitoring, maintaining, and/or decommissioning UAV resources 15. ML Model Module 190 can include programming, instructions, and/or logic to operate circuitry to provide, for example, supervised learning using a regression model, unsupervised learning (clustering) techniques, pattern recognition for detecting data patterns, techniques employing Hidden Markov Models or Artificial Neural Networks and/or machine learning (ML) models. Machine learning (ML) Model Module 190 is shown as a separate module from Governance Platform 170, but can also be included with Governance Platform 170.

In an embodiment, Governance Platform 170 can include an optional graph and build module/model, e.g., in memory 150, and provides instructions and logic for operating circuitry to form/build graphs, e.g., for pricing, configuring, navigating, operating, managing, and/or monitoring UAV resources 15. Graph build module is not shown as included within the Governance Platform 170 or within memory 150, but it can be appreciated that a graphic module can be included within Governance Platform 170 or a separate module within memory 150. Further details and explanation of the Governance Platform 170, and its various modules 160, are discussed below. The Governance Platform 170 is not limited to the modules or models discussed above and any number of models/modules can be used in the Governance Platform 170.

In one or more further embodiments, memory 150 further includes a supervisory program having instructions for configuring the system 100, e.g., the UAV Resource Computing Environment 105, to call one or more, and in an embodiment all, of the program modules (e.g., APIs) 160. In an embodiment, the supervisory program calls methods and provides application program interfaces (APIs) for running and operating the Data Ingestion Module 155, the Governance Platform 170, and/or the ML Model Module 190. At least one application program interface (API) 195 is invoked in an embodiment to receive input data from a user, for example to run one or more of the functional units and/or modules 160, including the Governance Platform 170.

UAV Management System 100 provides one or more methods for provisioning one or more UAVs, configuring one or more UAVs, assembling one or more UAVs, setting up networking and communication functions for one or more UAVs, operating and/or managing one or more UAVs, monitoring and logging activity of one or more UAVs, maintaining one or more UAVs, and/or decommissioning one or more UAVs. It can be appreciated that while FIG. 1 shows UAV Management System 100 according to an embodiment as including Central Resource Computing Environment 105, and separate UAV Provider Computing Resources 25 and/or Operator Computing Resources 75, it can be appreciated that in an embodiment Central Resource Computing Environment 105 can be included within or part of the UAV Provider Computing Resources 25. That is, for example, UAV Management System 100 contemplates a UAV user/operator (interfacing through UAV Operator Computing Resources 75 (or console/interface 77)), a service/cloud provider employing Central Resource Computing Environment 105, and a UAV provider/deployer employing a UAV Provider Computing Resources 25 that handles UAV configuration, assembly, deployment, management, control and/or monitoring, it can be appreciated that the functions and services provided by Central Resource Computing Environment 105 can be incorporated within or as part of UAV provider operations including UAV Provider Computing Resources 25.

Figure 2:
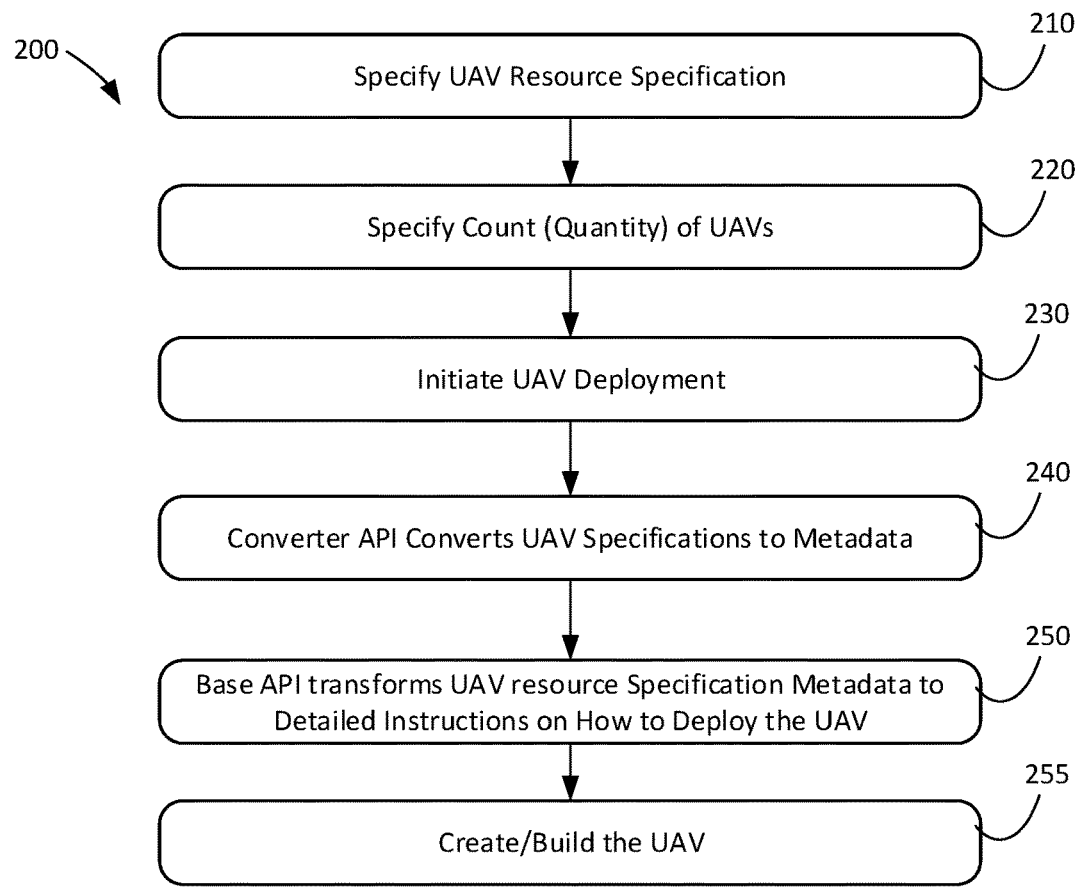
FIG. 2 illustrates a flow chart of an illustrative embodiment of a method 200 of commissioning, provisioning, configuring, assembling, and/or deploying UAV resources.

FIG. 2 illustrates a flow chart of one illustrative embodiment showing a method 200 of provisioning, creating, assembling, and/or building one or more UAVs. While the method 200 is described for the sake of convenience and not with an intent of limiting the disclosure as comprising a series and/or a number of steps, it is to be understood that the process 200 does not need to be performed as a series of steps and/or the steps do not need to be performed in the order shown and described with respect to FIG. 2, but the process 200 may be integrated and/or one or more steps may be performed together, simultaneously, or the steps may be performed in the order disclosed or in an alternate order.

Figure 3:
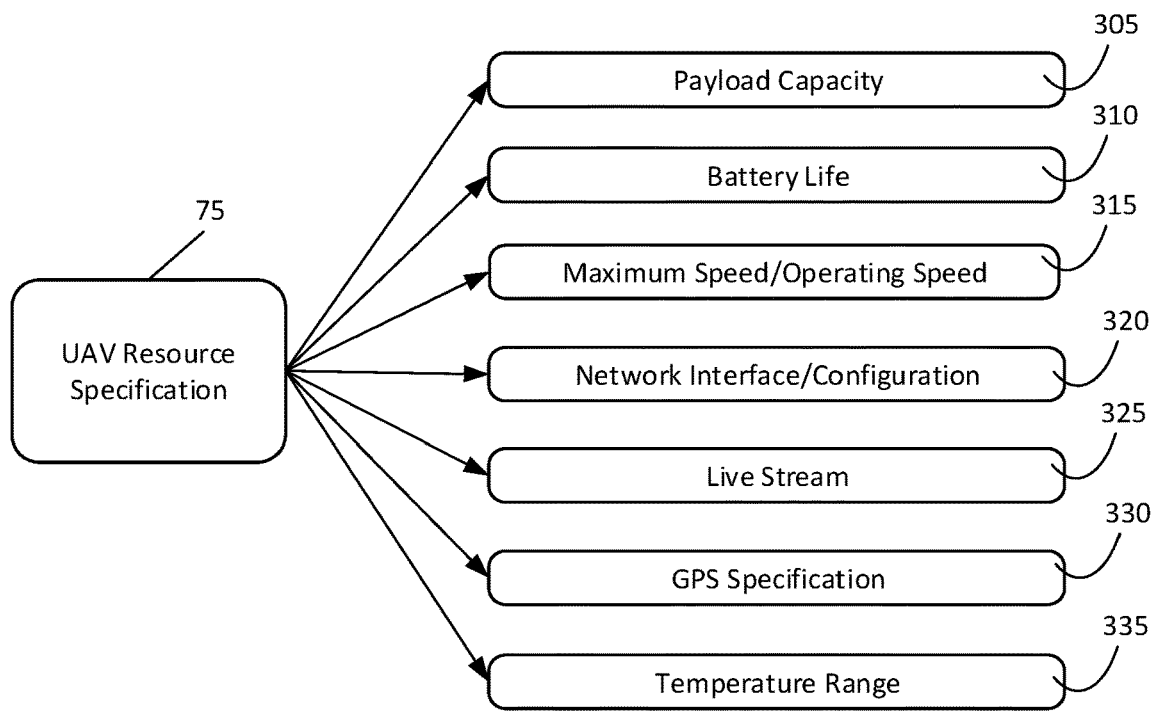
FIG. 3 illustrates a block diagram of a UAV Resource Interface showing user selected UAV specifications according to an approach of the disclosure.

Process 200 of provisioning, creating, and/or building one or more UAVs includes at 210 specifying the UAV resource specifications. In one or more embodiments at 210 a user, purchaser and/or operator through a remote console (e.g., UAV user computing resource 75 and/or console 77) specifies UAV resource specifications. FIG. 3 is a diagrammatic block diagram of an example of the various UAV specifications that the purchaser/operator of UAV resources 15 can specify. As indicated in FIG. 3, UAV specifications selected by the user through remote console 75 can include, in an example, payload capacity 305, battery life 310, Operating speed/maximum speed 315, network interface/configuration 320, whether to provide live streaming or not 325, the GPS specification 330, and operating temperature range 335. For example, one or more UAV models might be supplied by the UAV provider, and/or the UAV can be equipped with: one or more motors (e.g., a different amount of motors), different size motors, different type or size batteries that provide different UAV range and/or operating speeds, temperature sensors, and/or cameras for streaming video, to name just a few specification options. Other specifications for UAV resources are contemplated. The user/customer/operator can specify the UAV specifications through drop down menus and/or digital or hand-drawn diagrams to represent UAV(s) and their various specifications. The user/customer/operator in one or more embodiments can log onto the UAV providers website and/or network (e.g., UAV provider Computing Resources 25) to provide specifications for their UAV requests and/or needs.

The customer or operator who desires the UAV resources specifies at 220 the quantity or count of UAVs 15 that it wants having the specifications selected at 210. After 220 where the number of UAVs 15 of a first specification are selected, the user can go back to step 210 and indicate and complete a different (second) UAV specification and specify at 220 the count of UAVs 15 having the different (second) UAV specification. The specification and quantity of UAVs of each different specification can be selected at 210 and 220 until all the UAV resources are identified and selected.

At 230 UAV deployment is initiated. The UAV specifications selected at 210 are converted at 240 to metadata. In an approach, Metadata Converter Module (or Converter API) 175 converts the UAV specifications for each UAV to metadata (e.g., UAV Specification Metadata). In one or more approaches the Metadata Converter Module 175 resides on the UAV operator console 77 and the UAV operator console 77 converts the selected UAV specification(s) into metadata at the UAV operator console 77, and/or the Metadata Converter Module 175 resides on and/or converts the selected UAV specifications into metadata in the Governance Platform 170 and/or in the UAV Provider Computing Resources 25.

The UAV specification data is transformed at 250 into detailed instructions on how to provision and deploy the UAV. In one or more embodiments, Base Module (or Base API) 180 receives the UAV specification metadata (e.g., from Converter Module 180) and converts and/or transforms the UAV specification metadata into detailed instructions on how to configure the UAV. That is, in one or more approaches the Base Module 180 converts the UAV specification metadata into UAV configuration metadata to configure and/or assemble the UAV hardware and to select, configure, and/or install the UAV software. The Base Module 180 can reside on and convert the UAV specification metadata into detailed instruction on how to configure the UAV in the Governance Module 170 and/or the Base Module 180 can be downloaded onto the UAV Provider Computing Resources 25 where the UAV specification metadata is converted into UAV configuration metadata (e.g., detailed instructions on how to configure the UAV resources 15). At 260 the UAV configuration metadata (e.g., the detailed configuration instructions) is preferably used to configure, create, assemble, and/or build the UAV resources 15. In one or more aspects, manual and/or automated processes configure and build the UAV resources 15. More details on the configuring, creating, and building the UAV will be discussed in connection with FIGS. 4-5.

Figure 4:
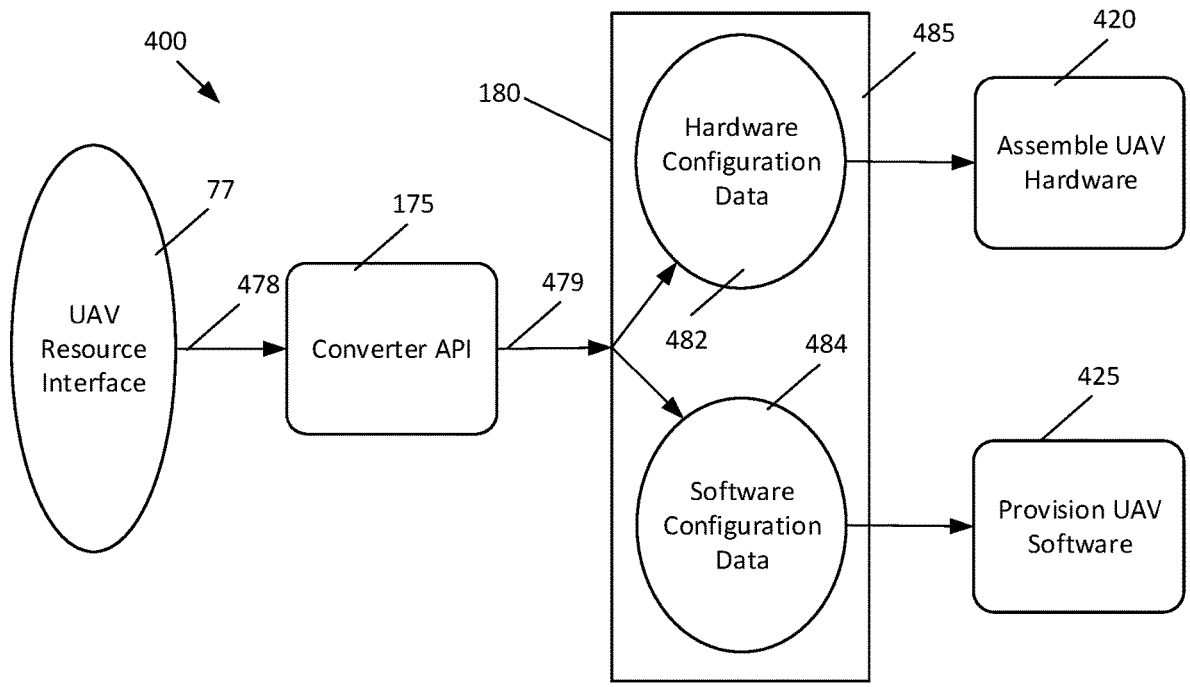
FIG. 4 illustrates a block diagram of commissioning, provisioning, configuring, assembling, and/or deploying one or more UAV resources according to an embodiment of the disclosure.

FIG. 4 shows a block diagram representation 400 of the flowchart of FIG. 2 showing the process 200 of provisioning, creating, assembling, and/or building the UAV resources 15 to meet the customer supplied specifications. The UAV Resource Interface 77 in the UAV Operator Computing Resources 75 is used to input the desired UAV resources 15 (e.g., the UAV resource specifications 478) and those UAV resource specifications 478 are transmitted to the Converter API (e.g., the Metadata Converter Module) 175 where the UAV resource specifications 478 are converted to metadata, more specifically UAV specification metadata 479. The UAV specification metadata 479 is transmitted and/or provided to the Base API (e.g., the Base Module) 180 which transforms the UAV specification metadata 479 to detailed UAV configuration metadata 485 (e.g., instructions on how to configure the UAV), including UAV hardware configuration metadata 482 (e.g., instructions on the hardware configuration) and UAV software configuration metadata 484 (e.g., instructions on the UAV software configuration). The UAV resource specification 478 requested by the purchaser/operator is typically converted to UAV specification metadata 479 (e.g., in the Converter API 175) and transformed into UAV configuration metadata 485 (e.g., hardware configuration metadata 482 and software configuration metadata 484) in Base Module 180 in the Central Resources Computing Environment 105, although the conversion and transforming of the UAV specifications 478 can be performed by the UAV provider using Base Module 180 in association with UAV Provider Computing Resources 25.

For example, the Base API 180 according to an approach will convert the UAV specification metadata 479 into, and output, hardware configuration metadata 482 and instructions regarding, for example, configuring the UAV structure/hardware (e.g., number of motors or model, CPU, memory capacity, battery size, GPS system, and/or temperature control system (e.g., temperature sensors)) so that the physical hardware of the requested UAV can be assembled and built. The Base API 180 according to an approach can alternatively or additionally convert the UAV specification metadata 479 into, and output, software configuration metadata 484 and instructions regarding, for example, configuring, uploading, and/or installing the UAV software specifications, including, for example, network configuration, manifest, logging activities, monitoring, maintenance, etc.

Using the hardware configuration metadata data and/or instructions 482, the UAV hardware is assembled at 420. It can be appreciated that the UAV hardware can be built and/or assembled by manual, automated, or a combination of manual and automated processes. The assembly and building of the UAV hardware resources will typically be performed by the UAV provider. Using the software configuration metadata and/or instructions 484, the UAV software is installed, uploaded and/or updated onto the UAV at 425. It can be appreciated that the software configuration data and/or instructions can be transmitted as Infrastructure as Code (IaC), and that the software can provision the network(s), the UAV interface, the subnet, the vlan, navigation functions, remote operation functions, management functions, and monitoring functions, etc. It can be appreciated that the UAV software can be provisioned, uploaded, installed, and/or updated using automated, manual, and a combination of automated and manual processes. For example, the UAV provider using UAV Provider Computing Resources 25 can interface with, control, manage, and/or review the uploading, installing, and/or updating the UAV software at 425.

Figure 5:
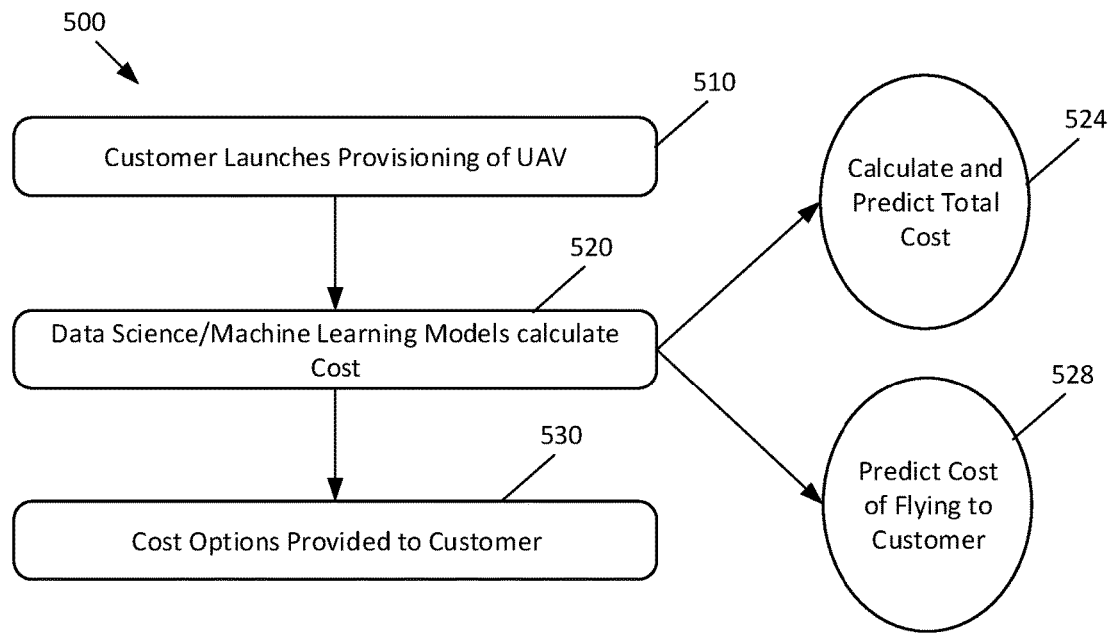
FIG. 5 illustrates a flow chart of an illustrative embodiment of a method 500 of pricing UAV resources according to an embodiment of the disclosure.

As part of, or separate from, commissioning, provisioning, and/or deploying of UAV resources 15, pricing for the use of the specified UAV resources can be computed and/or calculated. FIG. 5 illustrates a flow chart of an illustrative embodiment showing a method 500 of calculating the pricing of requested UAV resources. While the method 500 is described for the sake of convenience and not with an intent of limiting the disclosure as comprising a series and/or a number of steps, it is to be understood that the process 500 does not need to be performed as a series of steps and/or the steps do not need to be performed in the order shown and described with respect to FIG. 5, but the process 500 may be integrated and/or one or more steps may be performed together, simultaneously, or the steps may be performed in the order disclosed or in an alternate order.

In process 500, at 510 a customer launches the provisioning of one or more UAVs. Alternatively, or additionally, a potential customer can request a price for UAV resources. The request for pricing or launching the provisioning of UAV resources triggers at 520 models to calculate the cost of the requested UAV resources. In an embodiment, data science and/or machine learning (ML) models can calculate or be used in the calculation of cost and pricing for the UAV models. As part of calculating the cost at 520, the total cost can be calculated and predicted at 524, for example, based upon a host of factors, including, but not limited to, the hardware selected (including the quantity and specification of the UAVs), the time of the rental (e.g., the use period) and/or the services to be provided by the UAVs. In this regard, predicting the cost can include calculating the use periods, where different days and different parts of the day could have different rates. Calculating and predicting the cost at 524 can in an approach use machine learning (ML) and data analytic models. As part of calculating the cost at 520, the cost to fly to the location specified by the customer, and/or the distance traveled during use by the use period by the operator, can be calculated and/or predicted at 528 and included in the total cost prediction. Calculating and predicting the cost at 528 can in an approach use machine learning (ML) and data analytic models. The cost calculations and options are provided to the customer at 530. The cost options can be based upon the methods of 524, 528 and a combination of the methods of 524, 528, and in an embodiment utilizes machine learning (ML) models to refine and improve upon the cost calculations/predictions.

Figure 6:
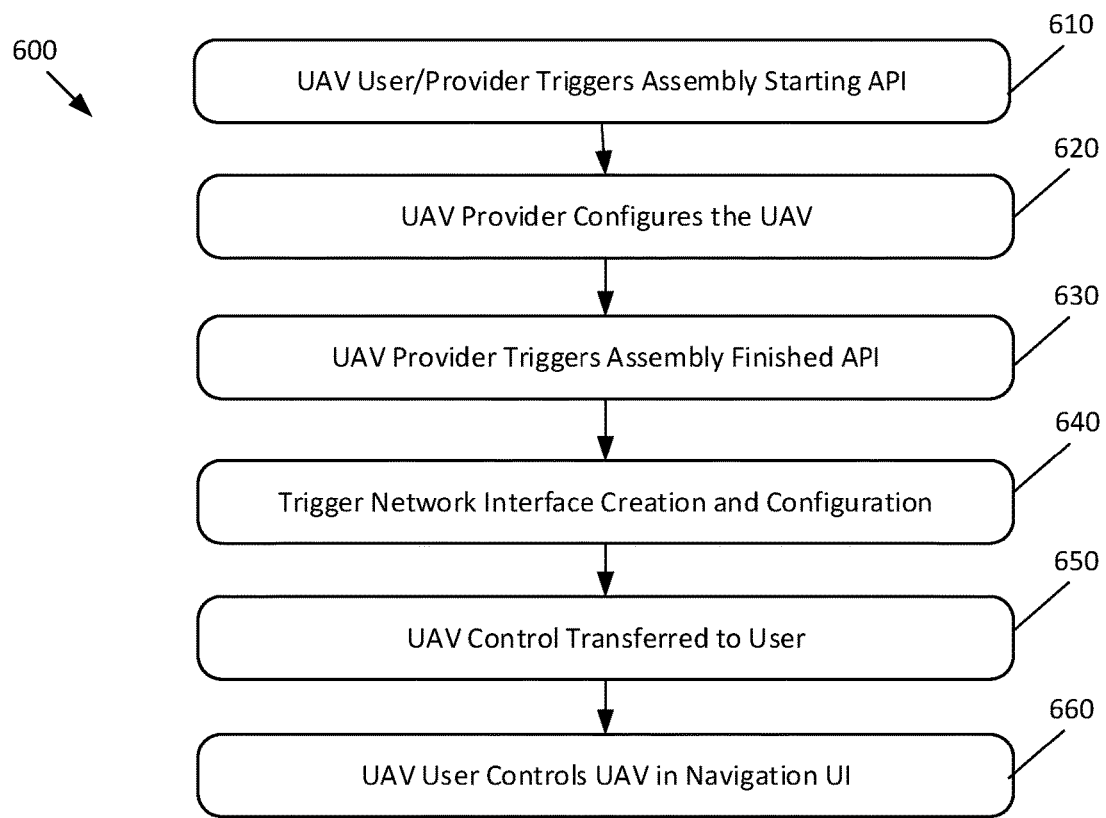
FIG. 6 illustrates a flow chart of another illustrative embodiment of a method 600 of commissioning, provisioning, configuring, assembling, and/or deploying UAV resources.

In one or more approaches, machine learning (ML) models and data analytics can be used in pricing the UAV resources, and in other UAV functions, including, but not limited to, UAV navigation, calculating battery usage (and degradation), activity logging, managing, monitoring, operating, controlling, and maintenance activities. As an overview, a machine learning (ML) model and/or system is a specialized computer system, or set of computer systems, configured with hardware and/or software logic (in combination with hardware logic upon which the software executes) to detect patterns and predict behavioral patterns. These machine learning (ML) models process, analyze, and manipulate data at various levels of interpretation which, when combined with the inherent strengths of digital computing, can solve problems with high accuracy and resilience on a large scale. IBM Watson™ is an example of one such machine learning (ML) cognitive system which can process data, including for example, human readable language and identify patterns in data, and for example make inferences between text passages and/or data with human-like accuracy or better, at speeds far faster than human beings and on a much larger scale. In general, such machine learning (ML) models and cognitive systems are able to perform the following functions:

Navigate the complexities of human language and understanding
Ingest and process vast amounts of structured and unstructured data
Generate and evaluate hypotheses
Weigh and evaluate responses that are based only on relevant evidence
Provide situation-specific advice, insights, and guidance
Improve knowledge and learn with each iteration and interaction through machine learning (ML) processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection (memorization and recall) from data points (data, images, text, voice)
Predict and sense with situation awareness that mimics human cognition based on experiences
Answer questions based on natural language and specific evidence FIG. 6 illustrates a flow chart of another illustrative embodiment showing a method 600 of provisioning, creating, assembling, building, and/or deploying one or more UAVs 15 (e.g., UAV resources). While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 may be integrated and/or one or more steps may be performed together, simultaneously, or the steps may be performed in the order disclosed or in an alternate order.

In the process 600, at 610 the UAV user or the UAV provider triggers assembly starting API which commences the start of the UAV assembly/build, and at 620 the UAV provider configures/assembles the UAV (e.g., configures the hardware and the software for each UAV). When the UAV provider completes the UAV assembly, the assembly finished API is triggered at 630. When the UAV assembly is finished, the network interface with the UAV is created and configured at 640. UAV control is transferred to a UAV user at 650, and the UAV user controls/operates the UAV in a Navigation User Interface (UI) at 660. In one or more aspects, the UAV user can be the UAV provider, although typically the UAV user will be a customer, third party, or operator who requested UAV resources from a UAV provider. In process 600, UAV resources 15 are assembled, a network connection is configures/provided between a user/operator console 77 and the UAV resources 15, and control of the UAV resources 15 is handed off to the UAV operator/user for operation and control by the UAV operator/user via a UAV navigation user interface (UI).

Each UAV is loaded with a UAV provider API package. The UAV provider API package in one or more approaches is a group of minified operating system (OS) containers preferably running in parallel. The UAV provider API package serves as a gateway for all incoming and outgoing communications with the UAV 15. The UAV API package listens for events (e.g., communications and/or signals) from the UAV 15 and communicates with the UAV provider, typically through UAV Provider Console 30 and/or UAV Provider Computing Resources 25. In an aspect, the UAV 15 communicates and interacts with the Central Resource Computing Environment 105, UAV Provider Computing Resources 25, and/or Operator Computing Resources 75. For example, the UAV 15 can communicate and interact directly or indirectly with Central Resource Computing Environment 105, UAV Provider Computing Resources 25, and/or Operator Computing Resources 75. For example UAV 15 can communicate and/or interact with (a) the UAV Provider Computing Resources 25 which in turn communicates and/or interacts with the Central Resource Computing Environment 105 and/or the Operator Computing Resources 75; (b) the Central Resource Computing Environment 105 which in turn communicates and/or interacts with the UAV Provider Computing Resources 25 and/or Operator Computing Resources 75; (c) Operator Computing Resources 75 which in turn communicates and/or interacts with Central Resource Computing Environment 105 and/or UAV Provider Computing Resources 25; (d) directly with the UAV Provider Computing Resources 25; (e) directly with Central Resource Computing Environment 105; and/or (f) directly with Operator Computing Resources 75. The information supplied by the UAV preferably is processed on the Central Resource Computing Environment 105, e.g., on the servers 105, where the processing takes advantage of the preferred more robust computing capacity of the Central Resource Computing Environment 105 (e.g., through cloud computing environments), including processing, decoding, configuring, managing, controlling, monitoring, logging (for example in a database), and/or storing UAV events, activities, and/or operations, handling navigational tasks, pricing, data analytical processing, and/or using machine learning (ML) models.

A UAV operator, UAV user, UAV provider, and/or other authorized party can request UAV information, and the requested UAV information can be supplied, using different access methods. The UAV provider through UAV Provider Computing Resources 25, and additionally or alternatively the Central Resource Computing Environment 105, can listen for configuration changes from the UAV operator, and communicate them to the UAV 15. Communication between the UAV resources 15, UAV operator (e.g., via Operator Computing Resources 75), the UAV provider (e.g., via UAV Provider Computing Resources 25) and/or the Central Resource Computing Environment 105 can be performed using http 2/3 TCP/IP or UDP protocol or XMPP protocol.

Figure 7:
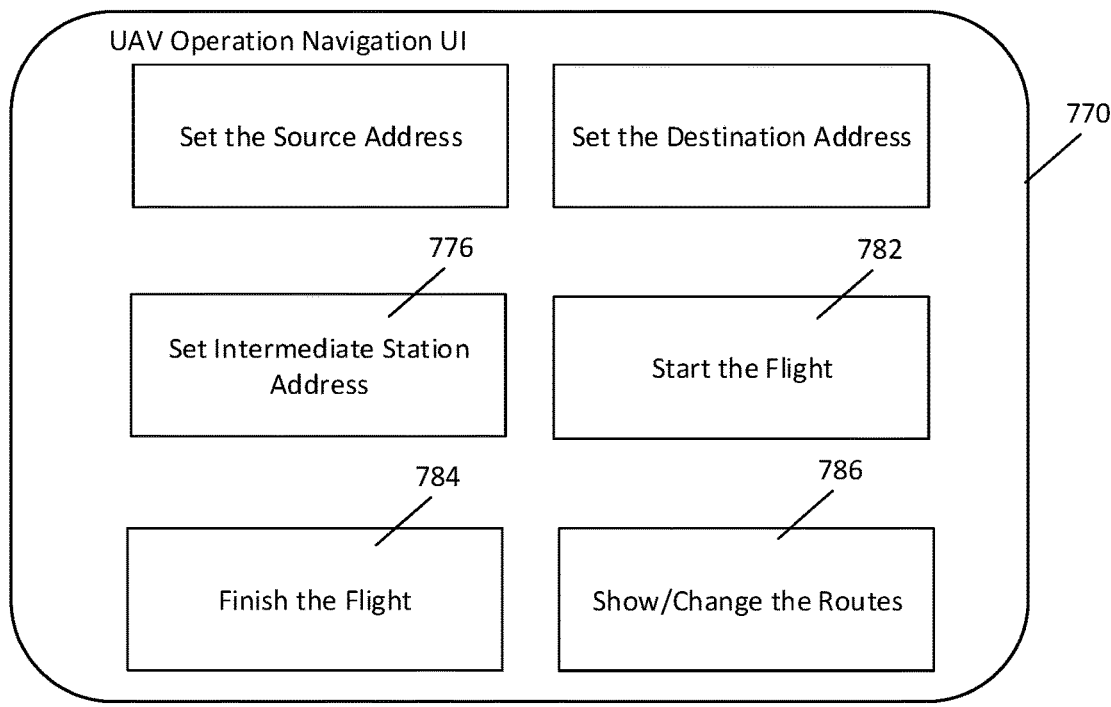
FIG. 7 illustrates a block diagram of a UAV Operation Navigation User Interface (UI) or API for operating one or more UAVs according to an embodiment of the disclosure.

FIG. 7 illustrates a UAV Navigation User Interface 770. UAV Navigation User Interface 770 permits a user to control the navigation and operation of UAV resources 15. As an example, the UAV Navigation UI 770 permits a user to set the source address at 772, which permits an operator (e.g., the UAV provider or customer of the UAV provider) to set the address where the UAV is to fly to for docking, charging, and starting operations at the User's home base. The source address can be, for example, the address to pick up a package. The UAV Navigation UI 770 can also permit the user to set a destination address at 774, which permits the operator to select a destination address to, for example, drop off a package. The UAV Navigation UI 770 can also permit setting an intermediate station at 776, which permits an operator to set an address to, for example, recharge the UAV battery. The UAV Navigation UI 770 can also permit setting the start time of the flight at 782, the flight finish time at 784, and show and/or change the flight route at 786.

While FIG. 7 illustrates some of the features of the UAV Navigation UI 770, it can be appreciated that more or less navigation features can be included in the navigation control panel of UAV, for example, the operational speed of the UAV, manual or automated navigation routing, flight height, etc. Controls can be provided in the UAV Navigation UI 770 for manual flight control of the UAV. It can be appreciated that control of the one or more UAVs can be controlled from a remote source (e.g., Console 77 of UAV Operator Computing Resources 75 and/or Console 30 of UAV Provider Computing Resources 25). As an example, one or more joy sticks or similar control(s) can be used to control the inputs supplied to the UAV resources 15 to control its operation. It can be appreciated, that one or more navigation control functions, including for example the route calculation could be subject to machine learning (ML) and data analytic models.

Figure 8:
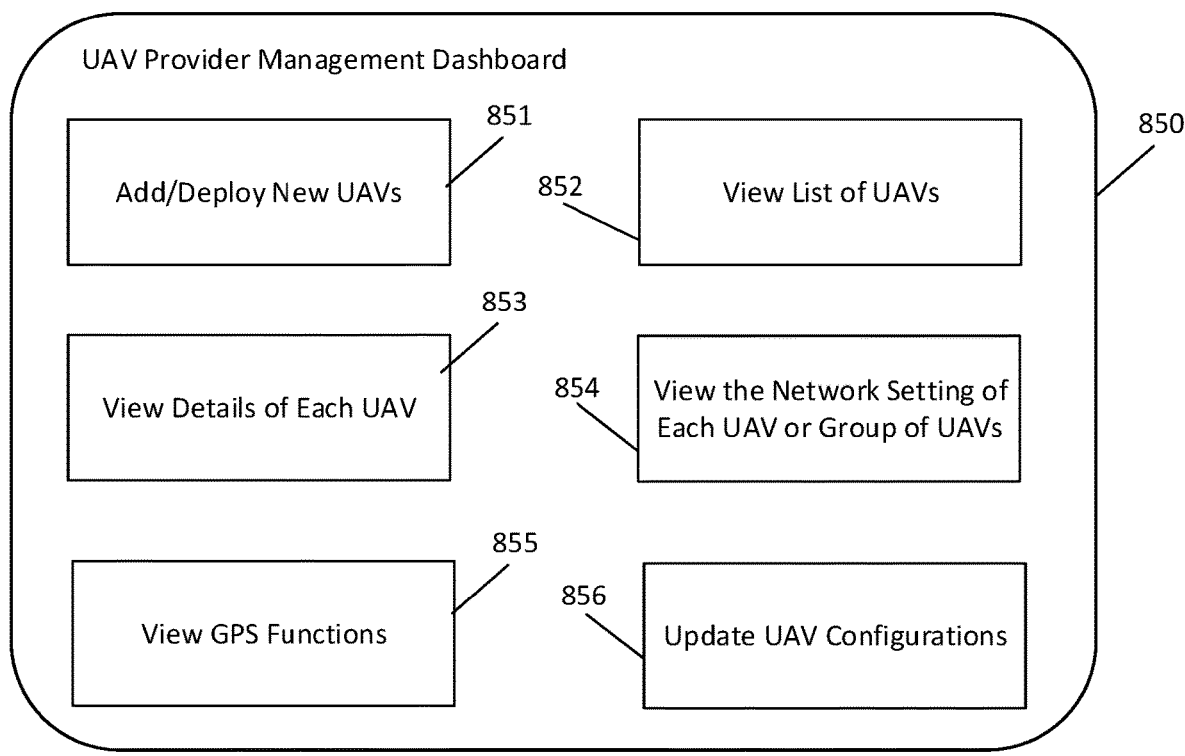
FIG. 8 illustrates a block diagram of a UAV Provider Management Dashboard or API for managing one or more UAVs according to an embodiment of the disclosure.

It can be further appreciated that UAV system management functions can be performed via a remote console. The remote (input) source for managing the UAV system, including for example the UAV resources, can use a User or Provider Interface Console, Terminal CLI tool, Infrastructure as Code (IaC), and/or digital (or hand drawn) sketches of the UAV system (e.g., the UAV resource). FIG. 8 illustrates a UAV Provider Management Dashboard 850. UAV Provider Management Dashboard 850 permits a UAV provider to manage the UAV system, including managing the UAV resources 15. Through the UAV Provider Management Dashboard 850, a UAV provider can add/deploy new UAVs at 851, view a list of UAVs at 852, view details of each UAV at 853, view the network setting of each UAV or group of UAVs at 854, view GPS functions at 855, and update UAV configurations at 856. The UAV Provider Management Dashboard 850 is just one example of a management dashboard and the features and functions that are subject to management by, for example, a UAV provider.

Figure 9:
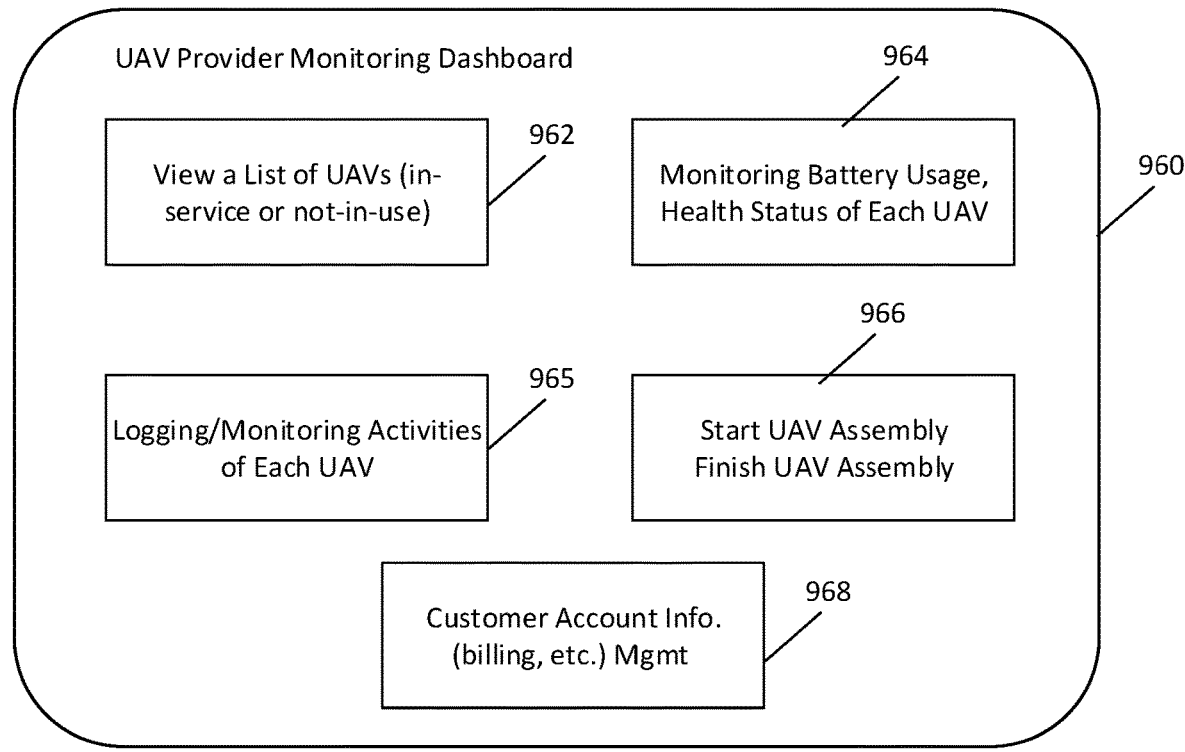
FIG. 9 illustrates a block diagram of a UAV Provider Monitoring Dashboard or API for monitoring one or more UAVs according to an embodiment of the disclosure.

FIG. 9 illustrates a UAV Provider Monitoring Dashboard 960. UAV Provider Monitoring Dashboard 960 permits a UAV provider to monitor (and/or manage) the UAV system, including managing the UAV resources 15. Through the UAV Provider Monitoring Dashboard 960, a UAV provider can view a list of UAVs under control by the UAV provider at 962, including a list of UAVs in service and a list of UAVs not in service. UAV Provider Monitoring Dashboard 960 also permits monitoring the battery usage and health status of each UAV at 964; viewing the log of activities performed by each UAV at 965; viewing the status of UAV assembly at 966 including the UAV assembly start time, completion (or projected completion) time, and current assembly stage; and view the customer account at 968, including billing and details surrounding the customer. The UAV Provider Monitoring Dashboard 960 is just one example of a monitoring dashboard, and the features and functions that are subject to monitoring by, for example, a UAV provider.

Figure 10:
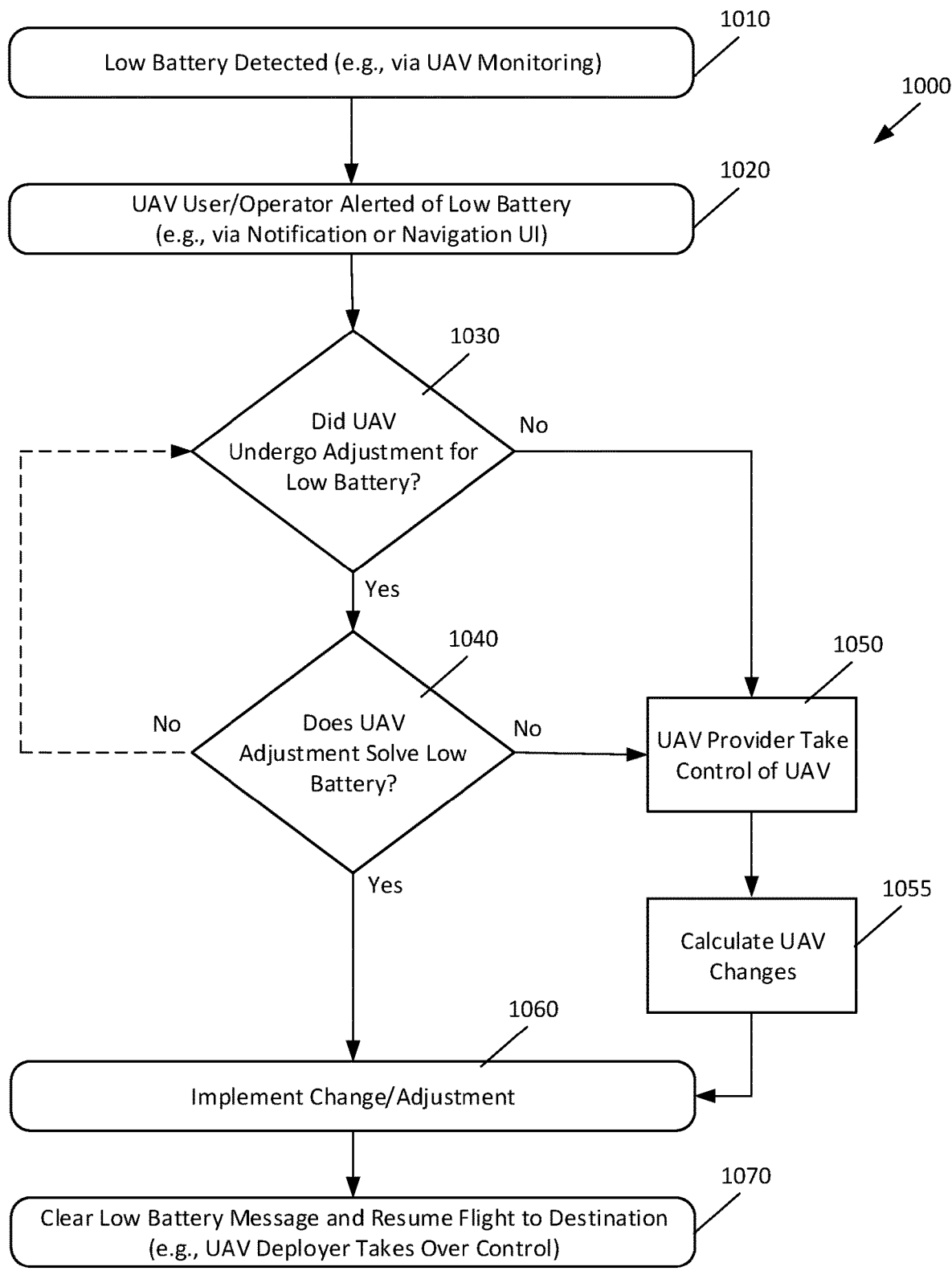
FIG. 10 illustrates a flow chart of an illustrative embodiment of a method 1000 of managing UAV resources, for example, battery resources of one or more UAVs.

As a dead battery could subject the UAV to damage and/or inoperability, a potentially important UAV management function/parameter that a UAV provider could monitor and/or manage is status of the battery charge. FIG. 10 illustrates a flow chart of an illustrative embodiment showing a method 1000 of monitoring and/or managing one or more UAVs, including managing, for example, a UAV's battery (e.g., battery status and/or charging). While the method 1000 is described for the sake of convenience and not with an intent of limiting the disclosure as comprising a series and/or a number of steps, it is to be understood that the process 1000 does not need to be performed as a series of steps and/or the steps do not need to be performed in the order shown and described with respect to FIG. 10, but the process 1000 may be integrated and/or one or more steps may be performed together, simultaneously, or the steps may be performed in the order disclosed or in an alternate order.

In the process 1000 of managing the battery charge of a UAV, during monitoring of the battery (e.g., the amount of battery charge/supply remaining) at 1010 a low battery charge condition is detected. A low battery condition can be detected based upon various criteria and according to a number of different methods. For example, if the battery charge drops below a certain amount and/or if during a flight it is determined that the battery either does not have enough charge for the UAV to reach its destination and/or the battery does not have sufficient charge for the UAV to reach its destination with certain amount of reserves or a safety margin. If a low battery condition is detected at 1010, then the UAV user/operator is alerted of the low battery condition at 1020. The UAV user/operator can be notified of the low battery condition by a number of different methods, including, for example, by a notification to the user/operator and/or through a navigation user interface, e.g., via UAV Navigation UI 770. The UAV Provider can also be alerted and/or notified of the low battery condition via UAV Provider Monitoring Dashboard 960, more specifically via monitoring window 964.

At 1030 it is determined whether the UAV user or operator adjusted for the UAV low battery. If at 1030, it is determined that the UAV operator/user adjusted parameters of operation of the UAV, for example routed the UAV to a charging station (1030: Yes), then process 1000 proceeds to 1040 where it is determined whether the adjustment solves or alleviates the low battery situation. On the other hand, if at 1030, it is determined that no adjustment has been made to the operational parameters of the UAV to solve, alleviate, or overcome the low battery condition by the user/operator (1030: No), for example within a time period after receiving notification, then the process 1000 can continue to 1050 where the UAV provider (or the Central Resource Computing Environment 105 and/or UAV Provider Computing Resources 25) can take operational control of the UAV. It can be appreciated that the monitoring of the UAV at 1030 to determine whether adjustments have been made to the operation of the UAV which would change the battery supply condition can be run one or more times (e.g., polling action) to determine whether any actions are undertaken by the UAV operator. In this regard, the monitoring to detect changes in the operation of the UAV that could affect the battery charge condition can continue for a period of time and/or until the battery charge condition meets a critical threshold, where the threshold can be set depending upon criteria that can be preset, predetermined, fixed, adjustable, and/or programmable. After a period of time, or upon determining that the critical threshold has been met, the UAV provider (or the Central Resource Computing Environment 105 and/or UAV Provider Computing Resources 25) can take control of the UAV resource 15 at 1050.

If an adjustment to the UAV operation that could affect the battery charge condition is detected at 1030 (1030: Yes), then the process 1000 continues to 1040 where it is determined whether or not the change in UAV operation (e.g., the UAV is routed to a charging station or its operational speed is changed) solves, alleviates, and/or eliminates the low battery charge condition. If at 1040, it is determined that the change in the UAV operation solves, alleviates, and/or eliminates the low battery charge condition (1040: Yes), then process 1000 continues to 1060 where the adjustment and/or change to the UAV operation is implemented, and then to 1070 where the low battery warning is cleared. In an example, at 1030, the UAV operation adjustment changes the UAV flight destination to a charging station to recharge the battery (and/or switch out the current battery for another battery), at 1040 the change in destination is determined to solve the low battery charge condition so the route change is implemented at 1060, and the low battery message can be cleared at 1070, for example, upon rerouting the UAV 15 to the battery charging station if appropriate, and/or after the battery is recharged or swapped out. With the battery warning cleared and/or the battery charged/swapped out, the UAV 15 can continue to its destination.

If at 1040 it is determined that the change implemented by the UAV operator does not solve the low battery condition or situation (1040: No), then process 1000 continues to 1050 where the UAV provider (or the Central Resource Computing Environment 105 and/or UAV Provider Computing Resources 25) takes control of the UAV. It can be appreciated, that if at 1040 it is determined that the change implemented by the UAV operator does not solve the low battery situation (1040: No), then process 1000 can alternatively proceed to 1030 (shown by dashed lines in FIG. 10) where the UAV Management System (or the Central Resource Computing Environment 105 and/or UAV Provider Computing Resources 25) can continue to monitor for changes to the UAV operation that could affect the low battery condition or situation. It will be appreciated, that at some point, in response to either no changes being made to the UAV operation or no changes to the UAV operation that alleviate and/or solve the low battery situation, the UAV provider (or the Central Resource Computing Environment 105 and/or UAV Provider Computing Resources 25) at 1050 takes control of the UAV operation. In response to the UV provider (or the Central Resource Computing Environment 105 and/or UAV Provider Computing Resources 25) at 1050 taking control of operation of the UAV, at 1055 one or more changes to the UAV operation can be determined and/or calculated to solve the low battery condition/situation. For example, the route of the UAV can be changed to include a charging station, a different navigation route can be configured, and/or the operational speed of the UAV can be changed, to name some illustrative changes to the operation of the UAV. Data analytics and machine learning (ML) models can be used to propose one or more solutions to overcome the low battery condition/situation. Upon one or more changes being determined or calculated to solve the low battery condition/situation, at 1060 the change can be implemented to solve and/or alleviate the low battery condition/situation. The process 1000, can then continue to 1070 where the low battery message can be cleared upon or after implementing the change. At 1070, control can also be changed back to the UAV operator.

It can be appreciated that in critical low battery conditions/situations, or other situations where UAV operation has been compromised (e.g., faulty motor), operational control of the UAV might be removed from the operator/user and reverted to the UAV Provider (or the Central Resource Computing Environment 105 and/or UAV Provider Computing Resources 25) and the UAV Management System 100 including, for example, the Central Resource Computing Environment 105 can calculate best solutions to control and manage the operation of the UAV, including an emergency landing of the UAV.

At the end of the lease term, or at some other time, UAV resources can be terminated and/or decommissioned. For example, a contract period can expire and/or a UAV operator (e.g., a customer) can decide to decommission the UAV resources, e.g., relinquish control over the UAV(s), and/or terminate the contract. In the decommissioning process, in one or more approaches, the UAV(s) are returned to the UAV provider base (or substation/satellite/other) location, unassigned to the operator, the network resources attached to the UAV(s) are freed up or decommissioned, the UAV IP address is returned, and/or all network connections are disconnected from the UAV. The UAV(s) can then be returned to the UAV provider for commissioning, provisioning, configuring, assembling, and/or deploying to another user. It can be appreciated that in one or more situations the UAV(s) are not returned to the UAV base, but can be commissioned and the software updated (network connections be reconfigured) and sent directly to the next UAV user (e.g., if no hardware changes are needed).

Figure 11:
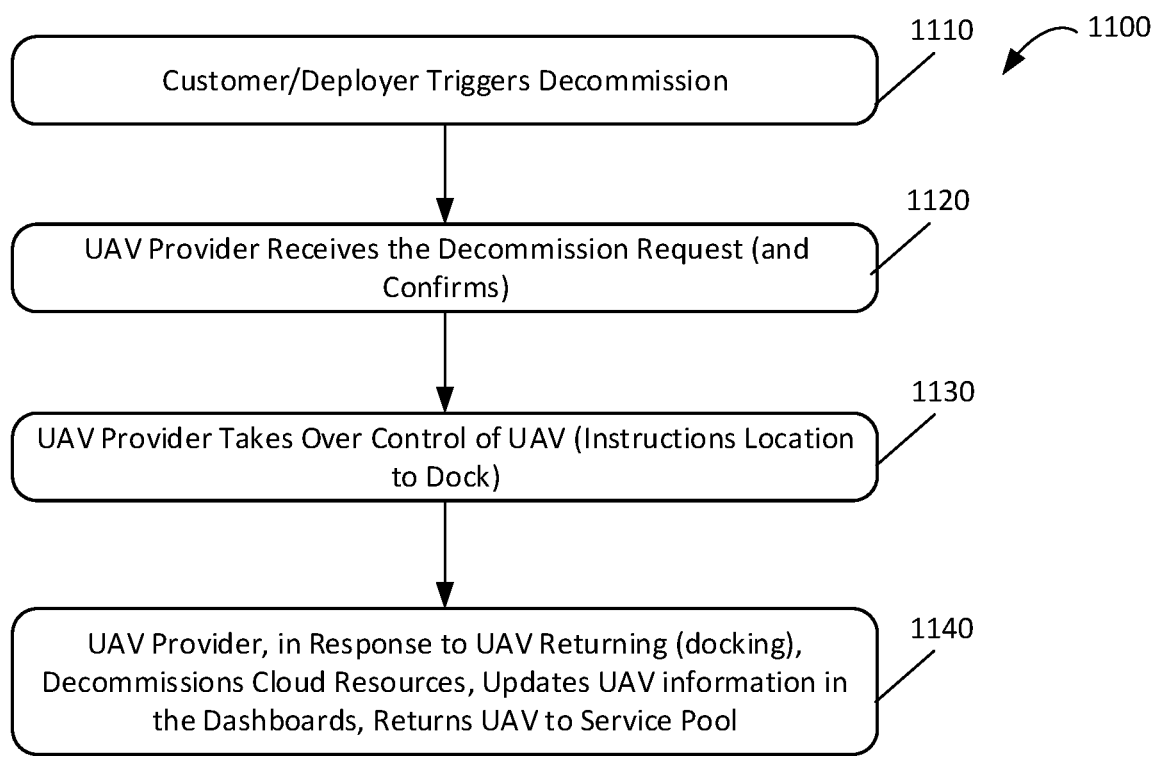
FIG. 11 illustrates a flow chart of an illustrative embodiment of a method 1100 of decommissioning one or more UAV resources.

FIG. 11 illustrates a flow chart of an illustrative embodiment showing a method 1100 of decommissioning one or more UAVs 15. While the method 1100 is described for the sake of convenience and not with an intent of limiting the disclosure as comprising a series and/or a number of steps, it is to be understood that the process 1100 does not need to be performed as a series of steps and/or the steps do not need to be performed in the order shown and described with respect to FIG. 11, but the process 1100 may be integrated and/or one or more steps may be performed together, simultaneously, or the steps may be performed in the order disclosed or in an alternate order.

In process 1100, at 1110 the customer (e.g., the UAV user) triggers the decommissioning of UAV resources 15 and at 1120 the UAV provider (and/or the Central Resource Computing Environment 105) receives the decommission request. In an approach, the UAV provider (and/or the Central Resource Computing Environment 105) at 1120 also confirms receiving the decommission request. At 1130 the UAV provider (and/or the Central Resource Computing Environment 105) takes over control of the UAV, and in one or more approaches instructs the UAV to fly to a desired location (e.g., the UAV provider's base and/or a substation). At 1140 the UAV provider (and/or the Central Resource Computing Environment 105), in response to the UAV flying to and arriving at the desired location (e.g., the UAV provider's base and/or substation), decommissions and/or terminates the computing resources (e.g., the Operator Computing Resources 75 and/or control by the UAV operator/user/renter), updates UAV information in the dashboards (e.g., UAV Provider Management Dashboard 850 and UAV Provider Monitoring Dashboard 960), and/or returns the UAV to the UAV service pool.

It can be appreciated that the system, e.g., UAV Management System 100, contemplates the use of physical locations which serve as a hardware management site for the UAV resources. In one or more embodiments, the UAV provider can have a base location to manage the UAV hardware, and in one or more aspects can additionally have one or more substations or satellite locations. One or more of the locations can serve to manage the UAV hardware. The base and/or satellite locations can be used to recharge the UAV resources, assemble the UAV hardware, maintain (e.g., fix) the UAV resources, and/or house the UAV inventory when not in use. When not in use the UAV(s) can be set into standby mode, either at the UAV provider locations, or at the operator facilities. When not in use the UAV resources can be docked in a docking station where the battery can be charged and/or systems can be updated. In one or more approaches, in response to the UAV running low on battery power, the UAV can fly to the nearest charging station. In this regard, a UAV provider can have dedicated charging stations, in addition to charging stations at its base and/or its satellite locations. In one or more embodiments, when a UAV is decommissioned or is in the process of being decommissioned, it can fly to anyone of the UAV provider bases, satellite locations, and/or charging stations for repurposing, or shipped back to one of the UAV provider locations.

It will be understood that one or more blocks of the flowchart illustrations in FIGS. 2, 5-6, & 10-11 and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a (non-transitory) computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 12:
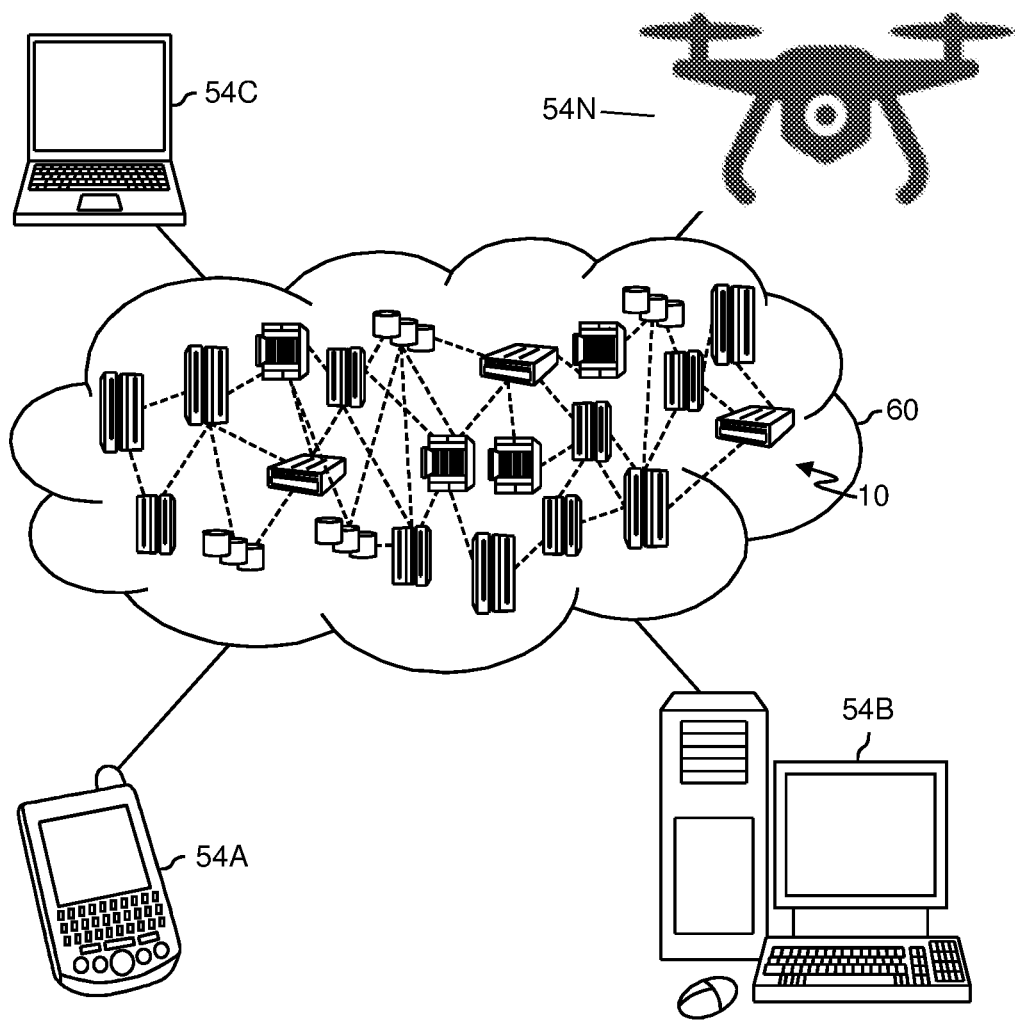
FIG. 12 depicts a cloud computing environment according to an embodiment of the disclosure.
Figure 13:
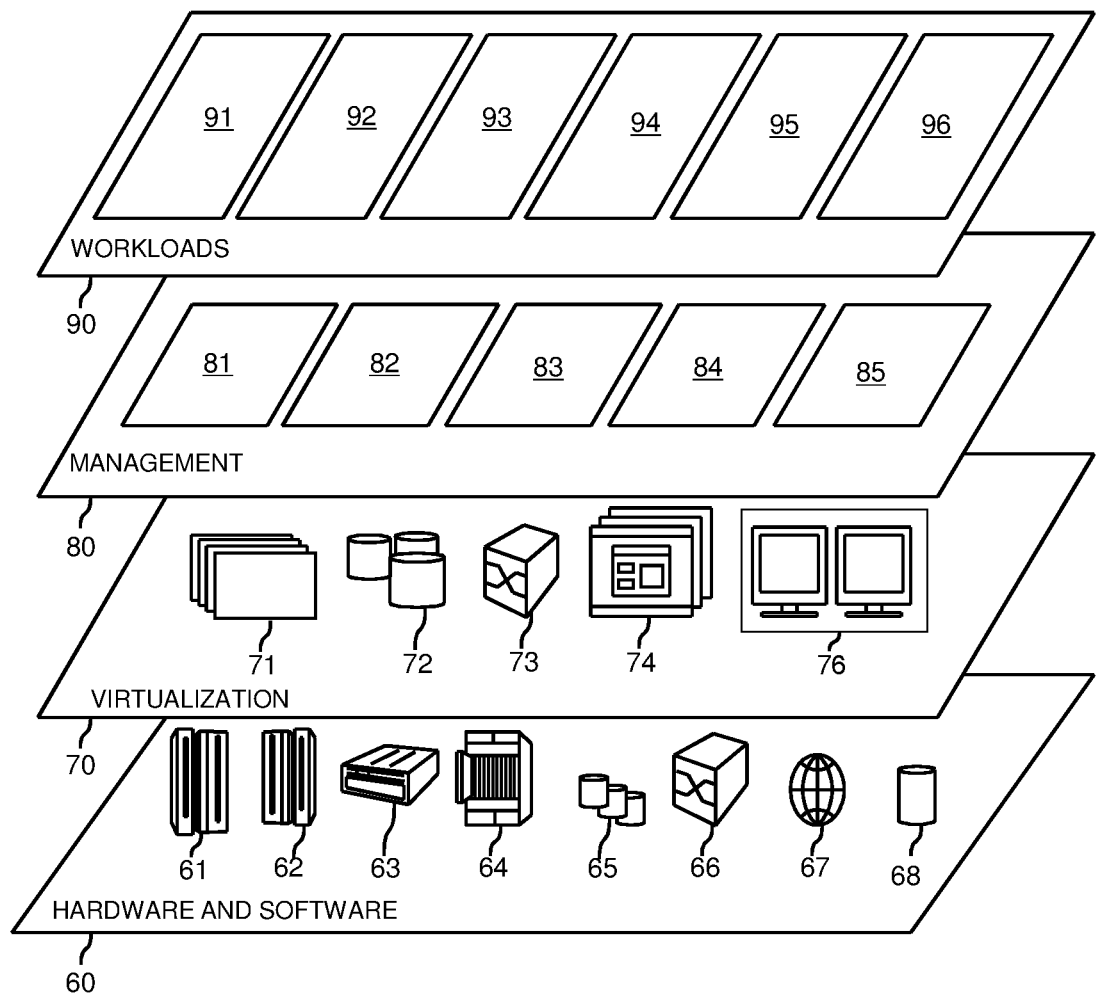
FIG. 13 depicts abstraction model layers of a cloud computing environment according to an embodiment of the disclosure.

Cloud computing is a model of service delivery for enabling convenient, on-demand network access to a shared pool of configurable computing resources (e.g., networks, network bandwidth, servers, processing, memory, storage, applications, virtual machines, and services) that can be provisioned and released through a service provider or vendor. This model can include one or more characteristics, one or more service models, and one or more deployment models. Characteristics can include, for example, on-demand service; broad network access; resource pooling; rapid elasticity; and/or measured services. Service models can include, for example, software as a Service (SaaS), Platform as a Service (PaaS), and/or Infrastructure as a Service (IaaS). Deployment models can include, for example, private cloud; community cloud; public cloud; and/or hybrid cloud. A cloud computing environment is typically service oriented with a focus on statelessness, low coupling, modularity, and semantic interoperability. Typically at the heart of cloud computing is an infrastructure that includes a network of interconnected nodes. UAV Management System 100 and/or Central Resource Computing Environment 105 can take advantage of cloud computing to run, control, manage, and monitor UAV resources 15. Referring now to FIG. 12, illustrative cloud computing environment 55 is depicted. As shown, cloud computing environment 55 includes one or more cloud computing nodes 10 with which local computing devices used by cloud consumers, such as, for example, personal digital assistant (PDA) or mobile (smart) telephone 54A, desktop computer 54B, laptop computer 54C, and/or UAV computer system 54N may communicate. Nodes 10 may communicate with each other. They may be grouped (not shown) physically or virtually, in one or more networks, such as Private, Community, Public, or Hybrid clouds, or a combination thereof. This allows cloud computing environment 55 to offer infrastructure, platforms and/or software as services for which a cloud consumer does not need to maintain resources on a local computing device. It is understood that the types of computing devices 54A-54N shown in FIG. 12 are intended to be illustrative only and that computing nodes 10 and cloud computing environment 55 can communicate with any type of computerized device over any type of network and/or network addressable connection (e.g., using a web browser). UAV resources 15, UAV Provider Computing Resources 25, and/or UAV Operator Computing Resources 75 can constitute or include computing resources 54 shown in FIG. 12. Referring to FIG. 13, a set of functional abstraction layers provided by cloud computing environment 55 (FIG. 1) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components can include: mainframes 61; RISC (Reduced Instruction Set Computer) architecture based servers 62; servers 63; blade servers 64; storage devices 65; and network and networking components 66. In some embodiments, software components include network application server software 67 and database software 68.

Virtualization layer 70 provides an abstraction layer from which the flowing examples of virtual entities may be provided: virtual servers 71; virtual storage 72; virtual networks 73, including virtual private networks; virtual applications and virtual operating systems 74; and virtual clients 76.

In one example, management layer 80 may provide the functions described below. Resource provisioning 81 provides procurement, preferably dynamic procurement, of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. Other functionality as illustrated by workload layer 96 is contemplated.

Figure 14:
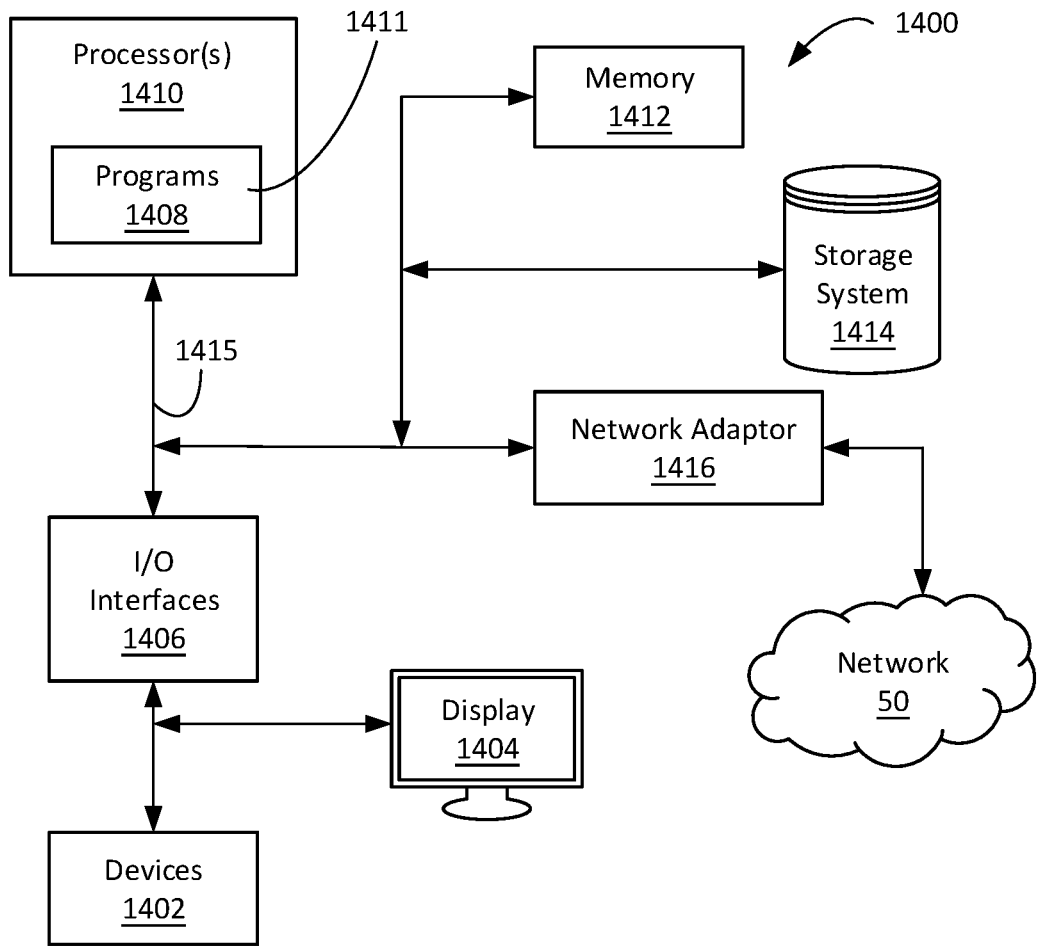
FIG. 14 is a block diagram of an example computing system 1200 in which aspects of the illustrative embodiments of UAV Provider Computing Resources and Customer/Operator Computing Resources, for example, can be implemented.

FIG. 14 illustrates an example computing and/or data processing system 1400 in which aspects of the present disclosure may be practiced. Computing system 1400 in an example can be representative of UAV Provider Computing Resources 25, Operator Computing Resources 75, and/or the computing devices or aspects of UAV resources 15. It is to be understood that the computer and/or data processing system 1400 depicted is only one example of a suitable system and is not intended to suggest any limitation as to the scope of use or functionality of embodiments of the present invention. For example, the UAV Provider Computing Resources 25, Operator Computing Resources 75, and/or UAV resources 15 shown may be operational with numerous other special-purpose computing system environments or configurations. Examples of well-known computing systems, environments, and/or configurations illustrated by FIG. 14 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer system 1400 may be described in the general context of computer system executable instructions, embodied as program modules stored in memory 1412, being executed by the computer system. Generally, program modules may include routines, programs, objects, components, logic, data structures, and so on that perform particular tasks and/or implement particular input data and/or data types in accordance with the present invention.

The components of the computer system 1400 may include, but are not limited to, one or more processors or processing units 1410, a memory 1412, and a bus 1415 that operably couples various system components, including memory 1412 to processor 1410. In some embodiments, the processor 1410, which is also referred to as a central processing unit (CPU) or microprocessor, may execute one or more programs or modules 1408 that are loaded from memory 1412 to local memory 1411, where the program module(s) embody software (program instructions) that cause the processor to perform one or more operations. In some embodiments, module 1408 may be programmed into the integrated circuits of the processor 1410, loaded from memory 1412, storage device 1414, network 50 (e.g., from Central Resource Computing Environment 105), and/or combinations thereof to local memory 1411.

The processor (or CPU) 1410 can include various functional units, registers, buffers, execution units, caches, memories, and other units formed by integrated circuitry, and may operate according to reduced instruction set computing ("RISC") techniques. The processor 1410 processes data according to processor cycles, synchronized, in some aspects, to an internal clock (not shown). Bus 1415 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 1400 may include a variety of computer system readable media, including non-transitory readable media. Such media may be any available media that is accessible by the computer system, and it may include both volatile and non-volatile media, removable and non-removable media.

Memory 1412 (sometimes referred to as system or main memory) can include computer readable media in the form of volatile memory, such as random-access memory (RAM), cache memory and/or other forms. Computer system 1400 can further include other removable/non-removable, volatile/non-volatile computer system storage media. By way of example only, storage system 1414 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1415 by one or more data media interfaces.

The computer system 1400 may also communicate with one or more external devices 1400 such as a keyboard, track ball, mouse, microphone, speaker, a pointing device, a display 1404, etc.; one or more devices that enable a user to interact with the computer system; and/or any devices (e.g., network card, modem, etc.) that enable the computer system to communicate with one or more other computing devices. Such communication can occur via Input/Output (I/O) interfaces 1406. Communications or network adapter 1416 interconnects bus 1415 with an outside network 50 enabling the data processing system 1400 to communicate with other such systems. Additionally, an operating system such as, for example, AIX ("AIX" is a trademark of the IBM Corporation) can be used to coordinate the functions of the various components shown in FIG. 14.

The computer system 1400 can communicate with one or more networks 50 such as a local area network (LAN), a general wide area network (WAN), and/or a public network (e.g., the Internet) via network adapter 1416. As depicted, network adapter 1416 communicates with the other components of computer system via bus 1415. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Those of ordinary skill in the art will appreciate that the hardware depicted in FIG. 14 may vary depending on the implementation. Other internal hardware or peripheral devices, such as flash memory, equivalent non-volatile memory, or optical disk drives may be used in addition to or in place of the hardware depicted. Moreover, the data processing system 1400 can take the form of any of a number of different data processing systems, including but not limited to, client computing devices, server computing devices, tablet computers, laptop computers, telephone or other communication devices, personal digital assistants, and the like. Essentially, data processing system 1400 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for assembling and managing remote unmanned aerial vehicle (UAV) resources, the method comprising:
   receiving by a UAV computing resource group UAV specifications to provision one or more UAVs that are remote from the UAV computing resource group with UAV hardware and UAV software, wherein the UAV computing resource group consists of at least one of: Central Resource Computing Group, UAV Provider Computing Resources, and combinations thereof and wherein the UAV specifications are received as at least one of a UAV specification group consisting of: a digital diagram, a hand sketch, or feature list and the UAV specification group provides at least two of a UAV parameter group comprising payload capacity and battery life;
   converting by the UAV computing resource group the UAV specifications to UAV specification metadata readable by the UAV computing resource group to prepare one or more remote UAVs;
   transforming by the UAV computing resource group the UAV specification metadata to UAV configuration metadata to assemble the UAV hardware for the one or more remote UAVs and to configure the UAV software for the UAV hardware used to assemble the one or more remote UAVs, wherein the UAV configuration metadata includes at least one of a UAV hardware group consisting of: number of motors, size of motors, UAV model, CPU, memory capacity, battery size, battery type, GPS system, video system, temperature control system, and combinations thereof;
   configuring, using the UAV configuration metadata, the UAV software for the UAV hardware used to assemble the one or more remote UAVs, wherein the UAV software includes an operating system and communication software that facilitates communication with and control over the one or more remote UAVs;
   assembling, using the UAV configuration metadata, the UAV hardware of the one or more remote UAVs; and
   installing the UAV software in the assembled one or more remote UAVs.

2. The method as recited in claim 1, further comprising pricing use of the one or more UAVs.

3. The method as recited in claim 2, wherein pricing the use of the one or more UAVs is calculated using machine learning models and is based upon a group consisting of at least one of: a quantity of UAVs, the specification of each one of the UAVs, the time of the rental, the services provided by the UAVs, and combinations thereof.

4. The method recited in claim 1, further comprising:
   deploying the one or more UAVs from a base location to a new location.

5. The method recited in claim 1, further comprising transferring control over operation of the one or more UAVs from the UAV provider to a third-party operator.

6. The method as recited in claim 1, further comprising creating and configuring a network connection to the one or more UAVs.

7. The method as recited in claim 1, further comprising remotely logging into the operating system of the one or more UAVs.

8. The method as recited in claim 1, further comprising loading each of the one or more UAVs with a UAV provider API package comprising a group of minified operating system containers running in parallel, wherein the UAV provider API package serves as a gateway for all incoming and outgoing communications with each UAV and detects UAV events.

9. The method as recited in claim 1, further comprising decommissioning the one or more UAVs, wherein decommissioning the one or more UAVs comprises at least one of a group consisting of: transferring control over operation of the one or more UAVs to a different operator, decommissioning a network connection to the one or more UAVs, and combinations thereof.

10. The method as recited in claim 1, further comprising managing the UAV resources, wherein managing the UAV resources comprises at least one of a group consisting of: allocating one or more UAVs; deploying one or more UAVs; handling navigation functions of one or more UAVs; selecting, assembling, and updating one or more UAV hardware configurations; selecting, installing, and updating UAV software; setting up and managing UAV network connections and settings; handling battery charging functions of the one or more UAVs; and combinations thereof.

11. The method as recited in claim 1, further comprising monitoring the one or more UAVs, wherein monitoring the one or more UAVs comprises monitoring at least one of a group consisting of: a battery condition; navigation functions of the one or more UAVs; activities of the one or more UAVs; location of the one or more UAVs; configurations of the one or more UAVs; network settings of the one or more UAVs; status of the UAV resources; and combinations thereof.

12. The method as recited in claim 1, wherein the UAV parameter group further comprises at least one of: operating speed of the UAV; maximum speed of the UAV; network interface; network settings; network configuration; camera operation; temperature range; GPS specification; and combinations thereof.

13. The method as recited in claim 1, further comprising one or more access methods to commission the one or more UAVs comprising at least one of a group consisting of: command line interface (CLI); infrastructure as code (IaC); Representational State Transfer Application Program Interface (REST API); and combinations thereof.

14. The method as recited in claim 1, further comprising managing a battery condition of a UAV wherein managing a battery condition of a UAV comprises:
   detecting a low battery condition;
   providing a notification to a notification group in response to the low battery condition, wherein the notification group consists of at least one of: a UAV provider; UAV provider computing resources; Central Computing Resource Environments; and combinations thereof; and
   implementing a change in UAV operation in response to detecting a low battery condition.

15. The method as recited in claim 14, further comprising:
   determining whether a UAV user implements a change in UAV operation; and
   taking control, in response to the UAV user not implementing a change in UAV operation, of the UAV by at least one of a group comprising: a UAV provider; UAV provider computing resources; Central Computing Resource Environments; and combinations thereof.

16. A computer program product for assembling and managing UAV resources, the computer program product comprising a non-transitory computer readable storage medium having program instructions embodied therewith, the program instructions executable by a processor to cause the processor to:
receive by a UAV computing resource group UAV specifications to provision one or more UAVs that are remote from the UAV provider resources with UAV hardware and UAV software, wherein the UAV computing resource group consists of at least one of: Central Resource Computing Group, UAV Provider Computing Resources, and combinations thereof and wherein the UAV specifications are received as at least one of a UAV specification group consisting of: a digital diagram, a hand sketch, or feature list and the UAV specification group provides at least two of a UAV parameter group comprising payload capacity and battery life;
convert by the UAV computing resource group the UAV specifications to UAV specification metadata readable by the UAV computing resource group to prepare one or more UAVs;
transform by the UAV computing resource group the UAV specification metadata to UAV configuration metadata to assemble the UAV hardware for the one or more remote UAVs and to configure the UAV software for the UAV hardware used to assemble the one or more remote UAVs, wherein the UAV configuration metadata includes at least one of a UAV hardware group consisting of: number of motors, size of motors, UAV model, CPU, memory capacity, battery size, battery type, GPS system, video system, temperature control system, and combinations thereof;
assemble UAV hardware using the UAV configuration metadata to create the one or more remote UAVs;
configure, using the UAV configuration metadata, the UAV software for the UAV hardware of the one or more UAVs, wherein the UAV software includes an operating system and communication software that facilitates communication with and control over the UAV hardware of the one or more remote UAVs;
install the UAV software in the assembled one or more remote UAVs; and
transfer control of the operation of the one or more remote UAVs to a third party.

17. The computer program product as recited in claim 16, further comprising programming instructions that when executed by the processor cause the processor to:
create a network connection with the one or more UAVs; and
remote login into an operating system of the one or more UAVs.

18. The computer program product as recited in claim 16, further comprising program instructions executable by the processor to cause the processor to monitor the one or more UAVs, wherein monitoring the one or more UAVs comprises programming instructions that when executed by the processor cause the processor to monitor at least one of a group consisting of: a condition of a battery; a network connection of a UAV; navigation functions of a UAV; real-time status of a UAV; activity logging of a UAV; location services of a UAV; operational speed of a UAV; camera operation of a UAV; charging activities of a UAV; assembling of a UAV; control of a UAV deploying of a UAV; decommission a UAV; and combinations thereof.

19. A system for assembling and managing unmanned aerial vehicle (UAV) resources, the system comprising:
a computer readable non-transitory storage medium having program instructions embedded therewith; and
a UAV provider computing system having a processor configured to execute said program instructions to cause the processor to:
receive by the UAV computing system UAV specifications from a third party to provision one or more UAVs that are distinct and remote from the UAV computing system with UAV hardware and UAV software, wherein the UAV computing resource group consists of at least one of: Central Resource Computing Group, UAV Provider Computing Resources, and combinations thereof and wherein the UAV specifications are received as at least one of a UAV specification group consisting of: a digital diagram, a hand sketch, or feature list and the UAV specification group provides at least two of a UAV parameter group comprising payload capacity and battery life;
convert by the UAV computing system the UAV specifications by a Converter Module to UAV specification metadata readable by computing resources to prepare the one or more remote UAVs;
transform by the UAV computing system the UAV specification metadata to UAV configuration data to assemble the UAV hardware for the one or more remote UAVs and configure the UAV software for the one or more remote UAVs, wherein the UAV configuration metadata includes at least one of a UAV hardware group consisting of: number of motors, size of motors, UAV model, CPU, memory capacity, battery size, battery type, GPS system, video system, temperature control system, and combinations thereof;
assemble, using the UAV configuration data, the UAV hardware of the one or more remote UAVs;
configure a network connection between the UAV computing system to the one or more remote UAVs;
configure, using the UAV configuration data, the UAV software for the UAV hardware for the one or more remote UAVs, wherein the UAV software includes an operating system and communication software to facilitate communication with and control over the one or more remote UAVs;
install the UAV software on the one or more remote assembled UAVs;
permit remote login into the operating system of the one or more remote assembled UAVs by the third party; and
transfer control over at least some of the operations of the one or more remote assembled UAVs to the third party.

20. The system of claim 19, wherein the processor is further configured to execute said program instructions to cause the processor to monitor at least one of a group consisting of: a condition of a battery; a network connection of a UAV; navigation functions of a UAV; real-time status of a UAV; activity logging of a UAV; location services of a UAV; operational speed of a UAV; camera operation of a UAV; charging activities of a UAV; assembling of a UAV;

control of a UAV deploying of a UAV; decommission a UAV; and combinations thereof.

\* \* \* \* \*